(12) United States Patent
Fung

(10) Patent No.: US 11,707,644 B2
(45) Date of Patent: Jul. 25, 2023

(54) VARIABLE—RESISTANCE EXERCISE MACHINE WITH NETWORK COMMUNICATION FOR SMART DEVICE CONTROL AND BRAINWAVE ENTRAINMENT

(71) Applicant: Blue Goji LLC, Austin, TX (US)

(72) Inventor: Coleman Fung, Austin, TX (US)

(73) Assignee: BLUE GOJI LLC, Austin, TX (US)

( * ) Notice: Subject to any disclaimer, the term of this patent is extended or adjusted under 35 U.S.C. 154(b) by 0 days.

(21) Appl. No.: 17/835,662

(22) Filed: Jun. 8, 2022

(65) Prior Publication Data

US 2022/0296961 A1 Sep. 22, 2022

Related U.S. Application Data

(63) Continuation-in-part of application No. 17/315,042, filed on May 7, 2021, and a continuation-in-part of
(Continued)

(51) Int. Cl.
*A63B 24/00* (2006.01)
*A63B 22/02* (2006.01)
*A63B 22/00* (2006.01)
*A63B 23/04* (2006.01)
*G06T 19/00* (2011.01)
(Continued)

(52) U.S. Cl.
CPC ...... *A63B 24/0003* (2013.01); *A63B 22/0046* (2013.01); *A63B 22/0285* (2013.01); *A63B 22/0292* (2015.10); *A63B 22/06* (2013.01); *A63B 23/04* (2013.01); *A63F 13/212* (2014.09); *A63F 13/214* (2014.09); *A63F 13/40* (2014.09); *A63F 13/65* (2014.09); *G06F 1/163* (2013.01); *G06F 3/011* (2013.01); *G06F 3/016* (2013.01); *G06T 19/006* (2013.01); *H04W 84/18* (2013.01)

(58) Field of Classification Search
CPC ............ A63B 24/0003; A63B 22/0046; A63B 22/0285; A63B 22/0292; A63B 22/06; A63B 23/04; A63F 13/212; A63F 13/214; A63F 13/40; A63F 13/65; G06F 1/163; G06F 3/011; G06F 3/016; G06T 19/006; H04W 84/18
See application file for complete search history.

(56) References Cited

U.S. PATENT DOCUMENTS 8,177,732 B2 5/2012 Einav et al.
11,058,912 B1 7/2021 Dunefsky
(Continued)

*Primary Examiner* — Phong H Dang
(74) *Attorney, Agent, or Firm* — Galvin Patent Law LLC; Brian R. Galvin

(57) ABSTRACT

A variable-resistance exercise machine with network communication for smart device control and brainwave entrainment, comprising an exercise machine with a plurality of moving surfaces, that each provide an independent degree of resistance to movement, a sensor that detects movement and provides output to a controller, a brainwave entrainment manager that selects a brainwave entrainment frequency based on the sensor output, and a controller that receives an input from a user device, changes the operation of the plurality of moving surfaces based on the input, and sends the brainwave entrainment frequency to the user device.

18 Claims, 21 Drawing Sheets

Related U.S. Application Data application No. 16/951,281, filed on Nov. 18, 2020, now Pat. No. 11,123,604, and a continuation-in-part of application No. 17/030,233, filed on Sep. 23, 2020, which is a continuation-in-part of application No. 17/030,195, filed on Sep. 23, 2020, which is a continuation-in-part of application No. 16/927,704, filed on Jul. 13, 2020, which is a continuation of application No. 16/867,238, filed on May 5, 2020, now abandoned, which is a continuation-in-part of application No. 16/793,915, filed on Feb. 18, 2020, now abandoned, which is a continuation-in-part of application No. 16/781,663, filed on Feb. 4, 2020, which is a continuation of application No. 16/391,199, filed on Apr. 22, 2019, which is a continuation-in-part of application No. 16/255,641, filed on Jan. 23, 2019, which is a continuation of application No. 16/223,034, filed on Jan. 23, 2019, now Pat. No. 10,688,341, said application No. 16/354,374 is a continuation-in-part of application No. 16/176,511, filed on Oct. 31, 2018, which is a continuation-in-part of application No. 15/853,746, filed on Dec. 23, 2017, now Pat. No. 10,265,578, which is a continuation of application No. 15/219,115, filed on Jul. 25, 2016, now Pat. No. 9,849,333, which is a continuation of application No. 15/193,112, filed on Jun. 27, 2016, now abandoned, which is a continuation-in-part of application No. 15/187,787, filed on Jun. 21, 2016, now Pat. No. 10,124,255, which is a continuation-in-part of application No. 15/175,043, filed on Jun. 7, 2016, now Pat. No. 9,766,696, which is a continuation-in-part of application No. 14/846,966, filed on Sep. 7, 2015, and a continuation-in-part of application No. 14/012,879, filed on Aug. 28, 2013, now Pat. No. 10,737,175.

(60) Provisional application No. 62/697,973, filed on Jul. 13, 2018, provisional application No. 62/330,602, filed on May 2, 2016, provisional application No. 62/330,642, filed on May 2, 2016, provisional application No. 62/310,568, filed on Mar. 18, 2016, provisional application No. 61/696,068, filed on Aug. 31, 2012.

(51) Int. Cl.
| | | |
|---|---|---|
| *G06F 1/16* | (2006.01) | |
| *A63F 13/65* | (2014.01) | |
| *A63F 13/212* | (2014.01) | |
| *A63F 13/214* | (2014.01) | |
| *A63F 13/40* | (2014.01) | |
| *A63B 22/06* | (2006.01) | |
| *G06F 3/01* | (2006.01) | |
| *H04W 84/18* | (2009.01) | |

(56) References Cited

U.S. PATENT DOCUMENTS

| | | | |
|---|---|---|---|
| 2007/0066403 A1* | 3/2007 | Conkwright | A63F 13/803 463/43 |
| 2007/0117680 A1* | 5/2007 | Neff | A63B 24/0084 482/8 |
| 2012/0116244 A1* | 5/2012 | McIntyre | A61N 1/36132 600/587 |
| 2015/0238817 A1* | 8/2015 | Watterson | A63B 23/0476 482/8 |
| 2016/0077547 A1* | 3/2016 | Aimone | A61B 5/1114 345/8 |
| 2018/0099184 A1* | 4/2018 | Eder | A63B 21/154 |
| 2018/0133507 A1* | 5/2018 | Malchano | A61B 5/0036 |
| 2020/0356136 A1 | 11/2020 | Aimone et al. | |
| 2021/0331037 A1* | 10/2021 | Fung | A63F 13/40 |
| 2021/0361943 A1* | 11/2021 | Black | A61N 2/002 |

* cited by examiner

VARIABLE—RESISTANCE EXERCISE MACHINE WITH NETWORK COMMUNICATION FOR SMART DEVICE CONTROL AND BRAINWAVE ENTRAINMENT

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/391,199
Ser. No. 15/853,746
Ser. No. 15/219,115
Ser. No. 15/193,112
Ser. No. 15/187,787
Ser. No. 15/175,043
62/310,568
Ser. No. 14/846,966
Ser. No. 14/012,879
61/696,068
62/330,602
62/330,642

BACKGROUND OF THE INVENTION

Field of the Art

The disclosure relates to the field of exercise equipment, and more particularly to the field of exercise machines for fitness and health.

Discussion of the State of the Art

Users often interact with fitness devices such as treadmills or elliptical trainers while using a smart device such as their smartphone or tablet, generally for consuming media. Generally, the interactions with the fitness device and smart device are separate, with media playback occurring independently of the user's operation of an exercise machine. For example, while running on a treadmill a user may choose to view a static screen displaying a television show. The elements in a television show are static, in that the elements do not change behavior based on the user's interactions with the television show, but instead perform predetermined actions. An example of a dynamic screen is that of a video game. The user interacts with a remote and influences the activity of the elements in the video game. At most, the user may interact with the screen performing an activity independent of actions related to interacting with the fitness device.

Furthermore, with the rapidly-expanding virtual reality industry, new interaction methods are being explored including a variety of controllers for gaming, wands, and motion-based input devices including gloves and camera-based hand tracking. However, these devices all focus on interacting with a user's hands and head movements, and ignore other parts of the body that could be used to improve interaction and immersion particularly while a user is within a known defined environment such as an exercise machine, while also expanding the possibilities for data collection.

It has been shown that exposing individuals to periodic signal, such as a light blinking at a frequency between 30 Hz and 50 Hz (preferably 40 Hz) can induce gamma waves in the brain which can have beneficial effects on the cognitive and neurological functions of the individual exposed to the signal by reducing the amount of harmful Tau proteins that are "built up" in the brain. Neurodegenerative conditions and diseases, such as Alzheimer's or Parkinson's, and the effects produced by these conditions and diseases may be minimized and in some cases improved through brainwave therapy. Because exercise machines are often used for a prolonged period of time by a user (e.g., a cardio workout is generally in the range of 20 to 30 minutes), they are perfectly positioned to also provide brainwave entrainment therapy to the user via periodic signals produced in a plurality of ways.

What is needed, is an exercise machine that is designed to connect to a variety of user smart devices for interaction, that receives direction from a connected smart device and provides interaction input to a connected smart device, that provides for the use of the human body as an input method through position and movement tracking, and that provides brainwave entrainment therapy responsive to the interaction input.

SUMMARY OF THE INVENTION

Accordingly, the inventor has conceived and reduced to practice, a variable-resistance exercise machine with network communication for smart device control and brainwave entrainment. In a preferred embodiment, the variable-resistance exercise machine comprises an exercise machine with a plurality of moving surfaces, that each provide an independent degree of resistance to movement, a sensor that detects movement and provides output to a controller, a brainwave entrainment manager that selects a brainwave entrainment frequency based on the sensor output, and a controller that receives an input from a user device, changes the operation of the plurality of moving surfaces based on the input, and sends the brainwave entrainment frequency to the user device.

According to a preferred embodiment, a variable-resistance exercise machine with communication for smart device control and brainwave entrainment is disclosed, comprising: a computing device comprising a memory, a processor, and a network interface device; a sensor configured to detect movement of a user of the exercise machine; a plurality of moving surfaces each configured to provide an independent degree of resistance to movement in response to the changes from a controller; the controller comprising a first plurality of programming instructions stored in the memory which, when operating on the processor, causes the computing device to: receive input from a user device via the network interface device, the input comprising a user interaction received via an interactive software application operating on the user device; receive output from the sensor, the output comprising a detected movement of the user of the exercise machine; change a degree of resistance of each of a plurality of moving surfaces based on the input; send the output to a brainwave entrainment manager; receive a brainwave entrainment frequency from the brainwave entrainment manager; send the brainwave entrainment frequency to the user device; and a brainwave entrainment manager comprising a second plurality of programming instructions stored in the memory which, when operating on the processor, cause the computing device to: receive the output from the controller; select a brainwave entrainment frequency based on the output; and send the brainwave entrainment frequency to the controller.

According to another preferred embodiment, a variable-resistance exercise machine with communication for smart device control and brainwave entrainment, comprising:

receiving output from a sensor on an exercise machine, the exercise machine comprising a plurality of moving surfaces each configured to provide an independent degree of resistance to movement, and the output comprising a detected movement of a user of the exercise machine; and receiving, at a computing device comprising a memory, a processor, and a network interface device, input from a user device via the network interface device, the input comprising a user interaction received via an interactive software application operating on the user device; selecting a brainwave entrainment frequency using a brainwave entrainment manager operating on the computing device, the brainwave entrainment frequency being selected based on the output; change a degree of resistance of each of the plurality of moving surfaces based on the input; and; sending the brainwave entrainment frequency to the user device.

According to an aspect of an embodiment, the user device is used to: receive the output from the network interface; change the display of a virtual object within the interactive software application at the brainwave entrainment frequency; and change the operation of the interactive software application in response to the output.

According to an aspect of an embodiment, the interactive software application is a virtual reality application.

According to an aspect of an embodiment, the interactive software application is software configured to enable use of the device for physical therapy.

According to an aspect of an embodiment, the user device is a wearable computing device.

According to an aspect of an embodiment, the exercise machine further comprises a plurality of steps configured to assist a human user in mounting and dismounting the exercise machine safely.

According to an aspect of an embodiment, at least a portion of the plurality of moving surfaces comprises an integrally-formed textured surface configured to provide adequate purchase when pressure is applied by a portion of the user's body.

According to an aspect of an embodiment, the user device comprises one or more lights and one or more speakers, wherein the one or more lights and the one or more speakers are configured to output the stimulation. 9. The exercise machine of claim 1, wherein the stimulation is either visual, auditory, vibratory, or electrical stimulation at a stimulation frequency between 0.5 Hz and 100 Hz.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
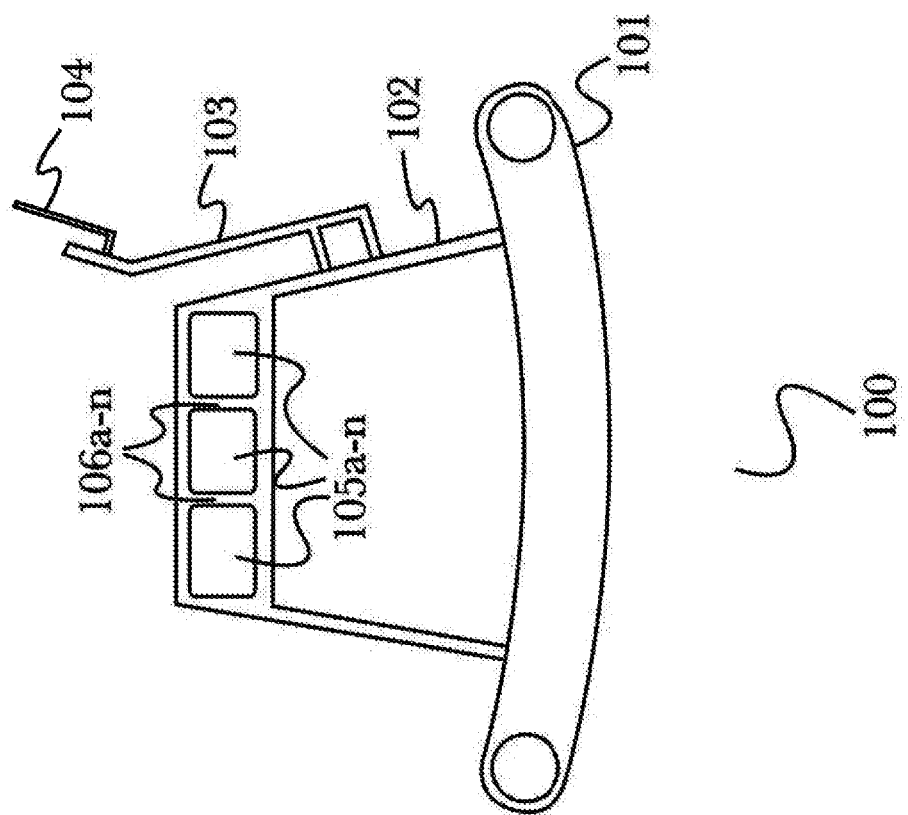
FIG. 1 is a side view of a variable-resistance exercise machine with network communication for smart device control and interactive software applications, according to a preferred embodiment of the invention.

The inventor has conceived, and reduced to practice, a variable-resistance exercise machine with network communication for smart device control and brainwave entrainment. In a preferred embodiment, the variable-resistance exercise machine comprises an exercise machine with a plurality of moving surfaces, that each provide an independent degree of resistance to movement, a sensor that detects movement and provides output to a controller, a brainwave entrainment manager that selects a brainwave entrainment frequency based on the sensor output, and a controller that receives an input from a user device, changes the operation of the plurality of moving surfaces based on the input, and sends the brainwave entrainment frequency to the user device.

The targeted brainwave entrainment therapy may be enhanced by selecting multiple treatment modalities (e.g., light, sound, vibration, electrical stimulation) applied either simultaneously or sequentially, by varying the frequency or frequencies of brainwave entrainment (e.g., from about 0.5 Hz to about 100 Hz), and by varying the intensity and/or scale of the treatment (e.g., from subtle, localized vibrational or electrical stimulation to area-wide, intense stimulation such as high-intensity room lighting and sound).

Implementations of visual brainwave entrainment to date have been limited to passive visual stimulation using physical lights (typically light emitting diodes, or LEDs). There is no interactivity or active engagement with the visual stimulation transducers, which makes the process less effective and uninteresting. Further, the visual stimulation transducers, being physical objects, cannot be changed in terms of size or shape, cannot be modified in reaction to user feedback, and are limited in terms of colors available, are generally fixed in place, and additional lights cannot be added to the system without physically connecting (and likely programming) additional lights.

Virtual objects, on the other hand, have none of these limitations, and can be used as visual stimulation transducers while users are engaged with an on-screen display. Brainwave entrainment using virtual objects provides essentially unlimited variability in terms of stimulator sizes, shapes, colors, movements, rotations, etc., and allows for the use of multiple stimulators simultaneously, each with different characteristics. Any change to a virtual object that is perceptible to a user and can be applied at a repeating frequency may be used to apply brainwave entrainment.

Further, gamification changes the brainwave stimulation from passive receipt of light therapy to active engagement with the visual stimulation objects, wherein the user's brain is actively stimulated during the activity, enhancing the effectiveness of the stimulation. Further, as the user is actively engaged with the game, stimulation can be applied based on where the user's attention is focused. Attention-based stimulation provides opportunities for both direct stimulation (e.g., flashing an object at which the user is looking, playing sounds or providing haptic feedback associated with a game object or activity that is the object of the user's attention, etc.) and indirect stimulation (e.g., flashing an object in the user's periphery of vision, playing sounds or providing haptic feedback associated with the game, but not the object of the user's attention such as a background element, background music or sounds, etc.). For example, eye tracking technology can be used to determine where the user is looking on the screen at any given time, and objects at which the user is looking can be used to provide visual stimulation even if the user changes his or her attention to a different object on the screen. The user's attention to objects on the screen can be monitored over time to determine whether the user is remaining focused on the activity, or is getting tired and losing focus, and the determined level of user attention can be used to change the type, intensity, directness, and other characteristics of the stimulation. Other means of determining the user's attention may be used such as assuming that the user's attention is focused on an object with which the user has just interacted.

Brainwave entrainment using virtual objects may be further enhanced by using multiple objects, each capable of providing complementary types of stimulation, and/or by intentionally directing the user's attention to objects providing certain types of stimulation. For example, if the user is playing a first person shooter (FPS) game that involves shooting attacking aliens, the user's attention will naturally be focused on finding attacking aliens, aiming at them, and shooting them. As each alien will be the focus of the user's attention sequentially, the alien at which the user is currently looking may be flashed at appropriate frequencies and in appropriate colors to provide appropriate brainwave stimulation. Simultaneously, other objects on the screen (or even the background) may be selected to provide a complementary visual stimulation in the periphery of the user's vision. Further, brainwave entrainment using virtual objects may be enhanced by selecting multiple treatment modalities (e.g., light, sound, vibration, electrical stimulation) applied either simultaneously or sequentially, by varying the frequency or frequencies of brainwave entrainment (e.g., from about 0.5 Hz to about 100 Hz), and by varying the intensity and/or scale of the treatment (e.g., from subtle, localized vibrational or electrical stimulation to area-wide, intense stimulation such as high-intensity room lighting and sound).

Brainwaves are frequencies at which electrical impulses in the brain occur. Brainwave frequencies change based on the state of consciousness of the user (e.g., sleeping, awake, dreaming, concentrating, relaxed, contemplative, meditative, irritated, etc.). Generally speaking, brainwaves are divided into five categories with frequencies roughly in the following ranges.

Delta waves are brainwaves in the general frequency range of 0.1 Hz to 4 Hz. Delta waves occur during deep sleep, and indicate a low level of arousal. Theta waves are brainwaves in the general frequency range of 4 Hz to 8 Hz. Theta waves occur in a state between wakefulness and sleep, such as during daydreaming and meditation, and can indicate drowsiness, creativity, or imagination. Alpha waves are brainwaves in the general frequency range of 8 Hz to 12 Hz. Alpha waves occur during a waking state, but are associated with relaxation, problem solving, analysis, and decision-making. Beta waves are brainwaves in the general frequency range of 12 Hz to 30 Hz. Beta waves occur during alertness, concentration, and strenuous mental activities such as solving mathematical problems and planning for the future. Gamma waves are brainwaves in the general frequency range of 30 Hz to 44 Hz. Gamma waves are associated with high-level information processing. There is evidence of Lambda brainwaves in a range around 47 Hz to 70 Hz, and other brainwave entrainment frequencies may be useful up to around 100 Hz. These ranges are approximate, and there is some overlap between them.

There are many promising uses of brainwave entrainment. One promising use of brainwave entrainment is to treat and/or prevent epilepsy. There is some evidence that epileptic seizures occur when the brain falls into theta wave activity (approximately 4 Hz to 8 Hz) during normal waking consciousness. Normal waking consciousness is typically associated with beta wave brain activity (12 Hz to 38 Hz). Performing brainwave entrainment at beta wave frequencies on persons with epilepsy may help prevent them from falling into theta wave brain activity, thus preventing seizures.

Another possible use for brainwave entrainment is to reduce agitation by performing brainwave entrainment at alpha wave frequencies (approximately 8 Hz to 12 Hz). Alpha wave frequencies are those brain wave frequencies between theta wave activity (typically associated with dreaming) and beta wave activity (typically associated with concentration and learning). Alpha wave frequencies are associated with relaxation and calmness. Therefore, brainwave entrainment at alpha wave frequencies may help induce relaxation and calmness.

Many different wave forms and/or pulse widths may be used in delivering entrainment at the selected frequency or frequencies, regardless of the modality (light, sound, etc.) of the stimulation. Wave forms may include, but are not limited to, rectangular wave forms, sine wave forms, triangular wave forms, and sawtooth wave forms. Pulse widths or duty cycles at any given frequency may be varied across the entire range of the frequency period. For example, at a given frequency, the duty cycle of each period of the frequency can be varied from nearly 0% on-time/100% off-time to nearly 100% on-time/0% off-time. Thus, for a given frequency, the stimulator (e.g., light) can be on and off for an equal amount of time in each period (a 50% duty cycle), mostly on during each period (e.g., a 75% duty cycle), or mostly off during each period (e.g., a 25% duty cycle). In these cases, the frequency of the stimulation is the same, but the amount of on-time of the stimulation in each period of the frequency is different.

Different pulse widths or duty cycles may be useful, depending on the circumstances. For example, when engaged in a mental task (e.g., viewing media on a smart device, watching a coach's, trainer's, or physical therapist's instructions, etc.) that requires visual acuity, a very low or very high duty cycle may be used to flash a light stimulator at a pulse width that can be captured by the human eye, but is not consciously recognizable. The human eye can capture flashes of light as short as $1/200^{th}$ of a second (equivalent to a frequency of 200 Hz), possibly shorter, but because of persistence of vision, cannot distinguish between repeated flashes of light at that frequency. Television and computer monitor frame refresh rates are typically 60 Hz or above, as this is a frequency at which persistence of vision makes it difficult to distinguish between frames. Thus, for example, the flicker of light stimulation at a frequency of 40 Hz and a 50% duty cycle would be easily perceivable by most human beings as each "on" pulse is $1/80^{th}$ of a second long and separated by another "off" time of another $1/80^{th}$ of a second. However, the flicker of light stimulation at the same frequency, but at an 80% duty cycle would likely not be consciously perceptible, as the "on" time of each period would last about $1/50^{th}$ of a second and the "off" time of each period would last about $1/200^{th}$ of a second. Thus, the "off" time of each period is within the limits of capture by the human eye (200 Hz), but would likely not be consciously perceptible because it is above the average frequency resolution (60 Hz) of the human eye, and the light would appear to the conscious mind to be on all the time.

In a similar manner, pulse widths or duty cycles may be adjusted to be perceptible to certain cells in the eye but not others. The human eye has two different types of light receptors: cones and rods. Cones are the dominant light receptors used under daylight conditions, and reception of light by cones is called photopic vision. Cones are able to distinguish colors, but are less sensitive to lower light intensity and the persistence of vision of cones is greater (meaning that the frequency of pulses that can be distinguished by cones is less than for rods). Rods are the dominant light receptors used at night and under low-light conditions, and reception of light by rods is called scotopic vision. Rods are not able to distinguish colors, but are more sensitive to lower light intensity and the persistence of vision of rods is less (meaning that the frequency of pulses that can be distinguished by rods is greater than for cones). Cones are greatly concentrated in the center of vision (where the person is directly looking) while rods are considerably more dominant in the periphery of vision. This difference in the type of light receptors in the eye can be used to advantage when selecting either a frequency of stimulation or a pulse width/duty cycle of that frequency. Again using the example above where visual acuity is required for a mental task, the pulse width or duty cycle of each period of a brainwave entrainment frequency of light can be selected to be perceptible to rods but not to cones, thus allowing the brainwave entrainment frequency of light to be perceived by the brain (through the rods in the periphery of vision which have a greater frequency resolution), but not consciously perceptible to the person (who is primarily focused on the light received by the cones (in the center of vision and with a lesser frequency resolution).

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

The term "amplitude" means the difference between the high or low state of a signal or wave form and the base state of that signal or wave form in a full period (high/low or on/off cycle) of the frequency of the signal or wave form.

The phrase "associative activity" as used herein means a second task or activity to be engaged in by an individual under assessment. The associative activity will often, but not always, be a mental or cognitive task such as performing arithmetic or identifying objects on a display.

The term "biometrics" as used herein mean data that can be input, directly measured, or computed using directly measured data from a user. This data includes but is not limited to physical and virtual movement, physiological, biological, behavioral, navigational, cognitive, alertness and attention, emotional, and brainwave measurements and patterns.

The phrase "brainwave entrainment" means application of a stimulus with a frequency from about 0.5 Hz to about 100 Hz as a means of neurological therapy. The stimulus may be of any perceptible form such as, but not limited to, light, sound, vibration, or electrical stimulation. The stimulus need not be from the same source (e.g., two light sources each at 20 Hz could be synchronized to produce a 40 Hz stimulus) or from the same modality (e.g., a sound source at 15 Hz and a light source at 15 Hz could be synchronized to produce a 30 Hz stimulus).

The phrase "composite function score" as used herein means a indicative of a relative level of neurological functioning comprised of weighted input of combined movement, biometric, and performance data sources collected by a given embodiment of the system, input by the user or an expert, historical performance and life history data from various sources, etc.

The term "conditioning" as used herein means all aspects of the system that can be used for the improvement, training, treatment of or exposure to aspects of neurological functioning. This could be in the form of a prescribed regimen from an expert, recommendation algorithm, self-selected experiences, or combination thereof.

The phrase "dual task assessment" as used herein means measurement of baseline performance on a set of tasks and/or activities performed individually, as well as performance of the same set of tasks and/or activities simultaneously. While this is typically a single primary task (usually motor) combined with a single associative activity (typically a neurological activity such as cognitive task), it should be taken herein to include other combinations of multiplexed tasks in combinations including, but not limited to, combinations in excess of two tasks and combinations that target a single or multiple aspects of neurological functioning.

The phrase "dual task cost" as used herein means any method for quantifying the difference in performance of a dual task assessment between the set of tasks performed individually and the same set of tasks performed simultaneously. Typically includes a comparison of each task performed in isolation to the performance on each of those tasks when performed simultaneously, either for a pair or larger combination of tasks.

The phrase "dual task stimulation" as used herein means the assignment of a single primary task (usually motor) combined with a single associative activity (typically a neurological activity such as cognitive task) for a user to perform, whereby the combination of the task and activity either stimulates neurological activity in certain areas of the brain, or which is associated with certain neurological functions, or both. It is not necessary that the precise areas of the brain associated with the neurological function are known, only that certain tasks and activities are associated with that neurological function. This phrase should be taken herein to include other combinations of multiplexed tasks in combinations including, but not limited to, combinations in excess of two tasks and combinations that target a single or multiple aspects of neurological functioning.

The phrase "duty cycle" means the amount of time that a frequency signal is in the "high" or "on" state, expressed as a percentage, wherein each full period (complete high/low cycle) of the frequency signal represents 100%. Note that "duty cycle" and "pulse width" are two different means of expressing the same concept.

The term "expert" as used herein means an individual with specialization in an area via formal training, credentials, or advanced proficiency in a modality of interest to the user or with regard to neurological functioning. This includes but is not limited to physicians, psychiatrists, physical therapists, coaches, fitness trainers, high level athletes or competitors, and teachers.

The term "frequency" means a signal or wave form having a periodic repetition of high/low or on/off states. Examples of signals and wave forms that exhibit the characteristic of frequency include, but are not limited to, rectangular wave forms, sine wave forms, triangular wave forms, and sawtooth wave forms.

The terms "game" or "game application" mean any computer game, puzzle, display, animation, or simulation comprising virtual objects that can be interacted with in some manner by a person. These phrases include, but are not limited to, traditional two-dimensional games and puzzles, three-dimensional virtual reality (VR) applications and environments, enhanced reality and augmented reality applications and environments (comprising both real-world elements and virtual elements, such as virtual objects superimposed on a video feed of the real environment surrounding the user), and interactive applications that allow one to sense virtual objects through haptic feedback (whether or not associated with a visual display of the objects).

The term "gamification" as used herein means the application of brainwave entrainment using a game or a game application.

The phrase "neurological condition" means a persistent neurological state or neurological function, or combination of persistent neurological states, neurological functions, or both. A neurological condition can mean a neurodegenerative condition indicating impairment, but is not limited to that meaning.

The phrases "neurological functioning" and "neurological function" as used herein mean any and all aspects of neuroscience and neurology where input, output, processing, or combination thereof involve aspects of the nervous system. These include but are not limited to functional as well as anatomical aspects of cognitive, sensory, motor, emotional, and behavioral functions and experiences.

The phrase "neurological state" as used herein means a state of the neurological system including, but not limited to cognitive states, emotional states, and brain physiology status (electrical activity, bloodflow, etc).

The phrase "primary task" as used herein means a first task or activity to be engaged in by an individual under assessment. The primary task will often, but not always, be a physical task or exercise such as walking on a treadmill.

The phrase "pulse width" means the amount of time that a frequency signal is in the "high" or "on" state, expressed as a time period that is a portion of each full period (complete high/low cycle) of the frequency signal. Note that "duty cycle" and "pulse width" are two different means of expressing the same concept. The phrase "pulse width modulation" is often used to denote changing of the pulse width of a frequency signal.

The term "transducer" as used herein means a device that converts an electrical signal into variations in a physical quantity, such as sound, light, pressure, or electrical stimulation. A display is included in the definition of "transducer."

The phrase "stimulation transducer" as used herein means a transducer used to stimulate one of the senses of a person or animal. Any portion of a display may be used as a stimulation transducer, non-limiting examples of which include virtual objects or backgrounds on the display.

The phrase "virtual object" means a computer-generated simulation of an object perceivable to a human being. Virtual objects include, but are not limited to, visible virtual objects such as two-dimensional and three-dimensional shapes shown on a display, non-visible virtual objects such as those that might be "felt" through haptic feedback (e.g., gloves equipped with haptic feedback equipment that provide resistance to the user's fingers around the contours of a virtual object in space), and any combination of the two (e.g., a visible virtual object displayed in a virtual reality environment through a VR headset which can also be "felt" by the user via haptic feedback). A virtual object does not have to be gamified and may be, for example, a virtual object displayed on a screen.

Detailed Description of Exemplary Embodiments

FIG. 1 is a side view of a variable-resistance exercise machine with network communication for smart device control and interactive software applications 100, according to a preferred embodiment of the invention. According to the embodiment, an exercise machine 100 may have a stable base 101 to provide a platform for a user to safely stand or move about upon. Additional safety may be provided through the use of a plurality of integrally-formed or detachable side rails 102, for example having safety rails on the left and right sides (with respect to a user's point of view) of exercise machine 100 to provide a stable surface for a user to grasp as needed. Additionally, side rails 102 may comprise a plurality of open regions 105a-n formed to provide additional locations for a user to grasp or for the attachment of additional equipment such as a user's smart device (not shown) through the use of a mountable or clamping case or mount. Formed or removable supports 106a-n may be used for additional grip or mounting locations, for example to affix a plurality of tethers (not shown) for use in interaction with software applications while a user is using exercise machine 100 (as described below, referring to FIG. 3).

Exercise machine 100 may further comprise a rigid handlebar 103 affixed or integrally-formed on one end of exercise machine 100, for a user to hold onto while facing forward during use. Handlebar 103 may further comprise a stand or mount 104 for a user's smart device such as (for example) a smartphone or tablet computer, so they may safely support and stow the device during use while keeping it readily accessible for interaction (for example, to configure or interact with a software application they are using, or to select different applications, or to control media playback during use, or other various uses). Handlebar 103 may be used to provide a stable handle for a user to hold onto during use for safety or stability, as well as providing a rigid point for the user to "push off" during use as needed, for example to begin using a moving treadmill surface (described below in FIG. 2). During use, a user may also face away from handlebar 103, using exercise machine 100 in the reverse without their view or range of motion being obscured or obstructed by handlebar 103 (for example, for use with a virtual reality game that requires a wide degree of movement from the user's hands for interaction).

As illustrated, the base 101 of exercise machine 100 may be formed with a mild, symmetrical curvature, to better approximate the natural range of movement of a user's body during use. Common exercise machines such as treadmills generally employ a flat surface, which can be uncomfortably during prolonged or vigorous use, and may cause complications with multi-directional movement or interaction while a user's view is obscured, as with a headset (described below in FIG. 3). By incorporating a gradual curvature, a user's movements may feel more natural and require less reorientation or accommodation to become fluid and proficient, and stress to the body may be reduced.

Figure 2:
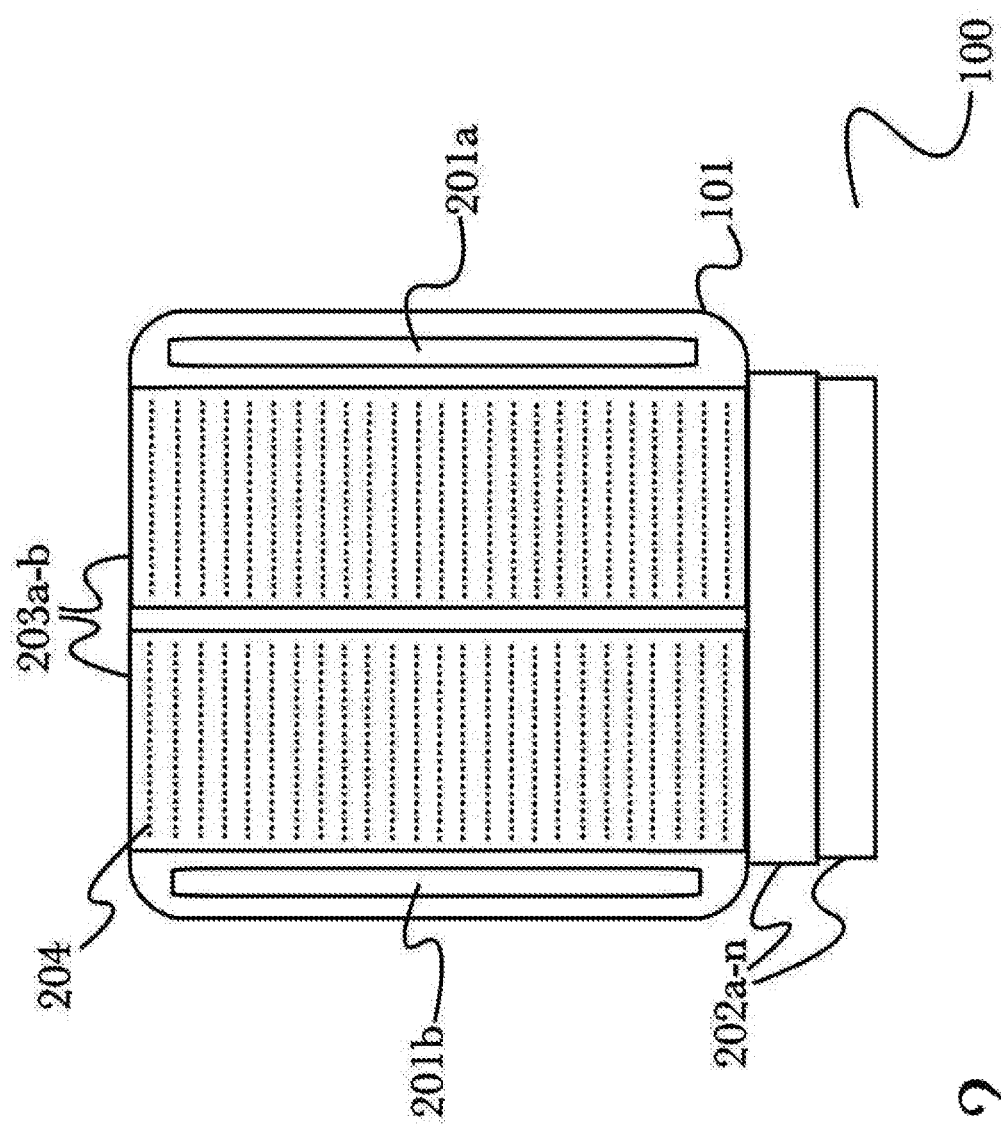
FIG. 2 is a top-down view of a variable-resistance exercise machine with network communication for smart device control and interactive software applications, according to a preferred embodiment of the invention.

FIG. 2 is a top-down view of a variable-resistance exercise machine 100 with network communication for smart device control and interactive software applications, according to a preferred embodiment of the invention. According to the embodiment, exercise machine 100 may comprise a stable base 101 to provide a platform for a user to safely stand or move about upon. Exercise machine 100 may further comprise right 201a and left 201b handrails for a user to brace against or grip during use, to provide a stable support for safety as well as a mounting point for external devices such as a plurality of tethers, as described below with reference to FIG. 3. A plurality of steps 202a-n may be used to provide a user with a safe and easy means to approach or dismount exercise machine 100, as well as a nonmoving "staging area" where a user may stand while they configure operation or wait for exercise machine 100 to start operation.

Unlike traditional treadmill machines common in the art, exercise machine 100 may be made with greater width to accommodate a wider range of free movement of a user's entire body (whereas traditional treadmills are designed to best accommodate only a jogging or running posture, with minimal lateral motion), and a plurality of separate moving surfaces 203a-b may be utilized to provide multiple separate surfaces that may move and be controlled independently of one another during use. For example, a user may move each of their legs independently without resistance applied, with separate moving surfaces 203a-b moving freely underfoot as a user applies pressure during their movement. This may provide the illusion of movement to a user while in reality they remain stationary with respect to their surroundings. Another use may be multiple separate moving surfaces 203a-b, with separate speeds of movement or degrees of resistance, so that as a user moves about during use they may experience physical feedback in the form of changing speed or resistance, indicating where they are standing or in what direction they are moving (for example, to orient a user wearing a virtual reality headset, as described below with reference to FIG. 3). Moving surfaces 203a-b may be formed with a texture 204 to increase traction, which may improve user safety and stability during use as well as improve the operation of moving surfaces 203a-b for use in multidirectional movement (as the user's foot is less likely to slide across a surface rather than taking purchase and applying directional pressure to produce movement). Use of multiple, multidirectional moving surfaces 203a-b may also be used in various therapeutic or rehabilitation roles, for example to aid a user in developing balance or range of motion. For example, a user who is recovering from an injury or surgery (such as a joint repair or replacement surgery) may require regular physical therapy during recovery. Use of multidirectional moving surfaces 203a-b along with appropriate guidance from a rehabilitation specialist or physical therapist (or optionally a virtual or remote coach using a software application) may make regular therapy more convenient and accessible to the user, rather than requiring in-home care or regular visits to a clinic. For example, by enabling a therapist or coach to manually vary the movement and resistance of the moving surfaces 203a-b, they can examine a user's ability to overcome resistance to different movements such as at odd angles or across varying range of motion, to examine the user's physical health or ability. By further varying the resistance it becomes possible to assist the user with rehabilitation by providing targeted resistance training to specific movements, positions, or muscle groups to assist in recovery and development of the user's abilities.

Exercise machine 100 may be designed without a control interface commonly utilized by exercise machines in the art, instead being configured with any of a variety of network interfaces such as WiFi or BLUETOOTH™ for connection to a user's smart device, such as a smartphone or tablet computer. When connected, a user may use a software application on their device to configure or direct the operation of exercise machine 100, for example by manually configuring a variety of operation settings such as speed or resistance, or by interacting with a software application that automatically directs the operation of exercise machine 100 without exposing the particular details of operation to a user. Additionally, communication may be bi-directional, with a smart device directing the operation of exercise machine 100 and with exercise machine 100 providing input to a smart device based at least in part on a user's activity or interaction. For example, a user may interact with a game on their smart device, which directs the operation of exercise machine 100 during play as a form of interaction with, and feedback to, the user. For example, in a racing game, exercise machine 100 may alter the resistance of moving surfaces 203a-b as a user's speed changes within the game. In another example, a user may be moving about on moving surfaces 203a-b while playing a simulation or roleplaying game, and their movement may be provided to the connected smart device for use in controlling an in-game character's movement. Another example may be two-way interactive media control, wherein a user may select media such as music for listening on their smart device, and then while using exercise machine 100 their level of exertion (for example, the speed at which they run or jog) may be used to provide input to their smart device for controlling the playback of media. For example, if the user slows down music may be played slowly, distorting the audio unless the user increases their pace. In this manner, exercise machine 100 may be used interchangeably as a control and feedback device or both simultaneously, providing an immersive environment for a wide variety of software applications such as virtual reality, video games, fitness and health applications, or interactive media consumption.

Figure 3:
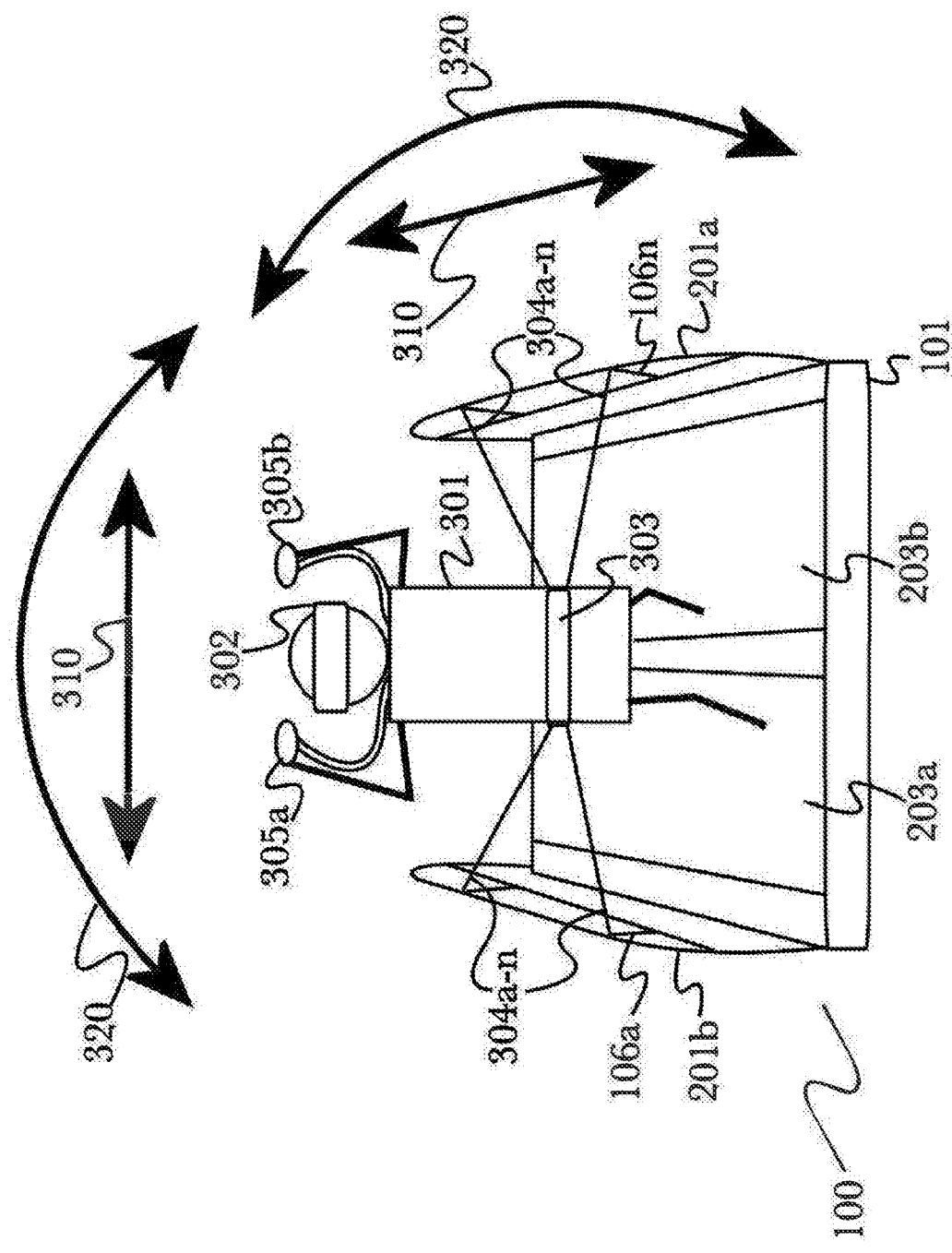
FIG. 3 is a diagram illustrating an exemplary method for interacting with a variable-resistance exercise machine with network communication for smart device control and interactive software applications using a smart device, illustrating the use of a plurality of connected smart devices and tethers, and showing interaction via the user's body as a control stick.

FIG. 3 is a diagram illustrating an exemplary method for interacting with a variable-resistance exercise machine 100 with network communication for smart device control and interactive software applications using a smart device, illustrating the use of a plurality of connected smart devices and tethers, and showing interaction via the user's body as a control stick. According to the embodiment, a user 301 may be standing, walking, or running on a variable-resistance exercise machine 100 with network communication for smart device control and virtual reality applications with a stable base 101 and two separate moveable surfaces 203a, 203b for separate movement of the user's legs. Exercise machine 100 may have fixed handlebars with affixed or integrally-formed controllers 305a, 305b for use as connected smart devices for interaction, and support rails 201a, 201b for a user to hold onto or affix tethers for safety or interaction when needed. User 301 may interact with software applications using a variety of means, including manual interaction via controller devices 305a, 305b that may be held in the hand for example to use as motion-input control devices (such as GOJI PLAY™ controllers, for example which were disclosed in parent application Ser. No. 14/012,879) or (as illustrated) may be affixed or integrally-formed into exercise machine 100. This may provide a user with traditional means of interacting with software applications while using exercise machine 100. Additionally, a user's body position or movement may be tracked and used as input, for example via a plurality of tethers 304a-n affixed to handlebars 201a, 201b and a belt, harness or saddle 303 worn by user 301, or using a headset device 302 that may track the position or movement of a user's head as well as provide video (and optionally audio) output to the user, such as a virtual reality headset that displays images while blocking the user's view of the outside world, or an augmented reality or mixed reality headset that combines presented information with the user's view using transparent or semitransparent displays (for example, using transparent OLED displays, hologram displays, projected displays, or other various forms of overlaying a display within a user's normal field of vision without obstructing the user's view). According to some embodiments, headset device 302 may be configured to provide brainwave entrainment therapy by providing one or more stimulations to the wearer of the headset device. According to some embodiments, headset device 302 may comprise one or more speakers, one or more lights, and/or a display screen wherein the speakers, lights, and/or display screen may provide visual and auditory stimulation to a user of exercise machine 100. For example, headset device 302 lights may blink at an appropriate frequency (e.g., 40 Hz) for providing brainwave entrainment. Body tracking may be used to recognize additional input data from user 301 (in addition to manual input via controllers 305a, 305b), by tracking the position and movement of user 301 during use. For example, motion tracking within a headset device 302 may be used to recognize a variety of translational 310 or rotational 320 movement of user's 301 head, such as leaning to the side, or looking over the shoulder. Tethers 304a-n may recognize a variety of movement of user's 301 torso, such as leaning, crouching, sidestepping, or other body movement. This body tracking may then be utilized either as feedback to rehab programs (for example, to track a user's posture for physical therapy coaching or exercises such as holding yoga poses) or input similar to a control stick or joystick in manual controller arrangements, for example by interpreting the user's entire body as the "stick" and processing their body movements as if they were stick movements done manually (such as to control in-game character posture or movement, or to direct movement in certain applications such as vehicle simulations that may turn or accelerate in response to stick movements).

For example, a user 301 on exercise machine 100 may be playing a virtual reality skiing game or rehab program wherein they are given audio and video output via a headset 302 to immerse them in a virtual ski resort. When user 301 is not skiing, they may be able to use manual controls 305a, 305b for such operations as selecting from an on-screen menu, or typing text input such as to input their name or to chat with other players using text. When they begin skiing within the game, user 301 may be instructed in proper ski posture or technique, and may then use their body to control various aspects of their virtual skiing, such as leaning to the side 320 to alter their course and avoid trees or other skiers, or jumping 310 to clear rocks or gaps.

Movement of their head may be detected by a headset 302 and used to control their view independently of their body as it is tracked by tethers 304a-n, allowing user 301 to look around freely without interfering with their other controls. In this manner, the user's entire body may serve as an input control device for the game, allowing and encouraging them to use natural body movements to control their gameplay in an immersive manner while still retaining the option to use more familiar manual control means as needed. Alternatively, specific body functions such as hip twisting are used as user feedback for rehabilitating programs, including rehab games.

Figure 8:
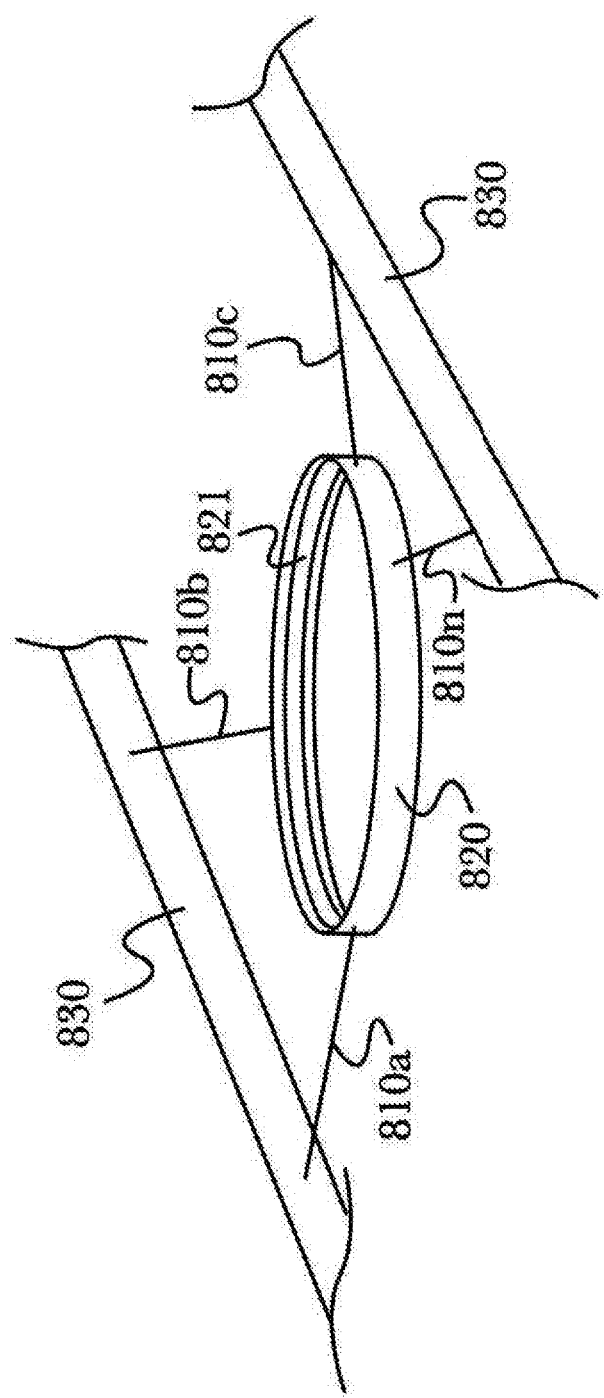
FIG. 8 is a diagram of an exemplary hardware arrangement of an apparatus for natural torso tracking and feedback for electronic interaction according to a preferred embodiment of the invention, illustrating the use of multiple tethers and a movable torso harness.

FIG. 8 is a diagram of an exemplary hardware arrangement 800 for natural torso tracking and feedback for electronic interaction according to a preferred embodiment of the invention, illustrating the use of multiple tethers 810a-n and a movable torso harness 820. According to the embodiment, a plurality of tethers 810a-n may be affixed or integrally-formed as part of a handle or railing 830, such as handlebars found on exercise equipment such as a treadmill, elliptical trainer, stair-climbing machine, or the like. In alternate arrangements, specifically-designed equipment with integral tethers 810a-n may be used, but it may be appreciated that a modular design with tethers 810a-n that may be affixed and removed freely may be desirable for facilitating use with a variety of fitness equipment or structural elements of a building, according to a user's particular use case or circumstance. Tethers 810a-n may then be affixed or integrally-formed to a torso harness 820, as illustrated in the form of a belt, that may be worn by a user such that movement of their body affects tethers 810a-n and applies stress to them in a variety of manners. It should be appreciated that while a belt design for a torso harness 820 is shown for clarity, a variety of physical arrangements may be used such as including (but not limited to) a vest, a series of harness-like straps similar to climbing or rappelling equipment, a backpack, straps designed to be worn on a user's body underneath or in place of clothing (for example, for use in medical settings for collecting precise data) or a plurality of specially-formed clips or attachment points that may be readily affixed to a user's clothing. Additionally, a torso harness 820 may be constructed with movable parts, for example having an inner belt 821 that permits a user some degree of motion within the harness 820 without restricting their movement. Movement of inner belt 821 (or other movable portions) may be measured in a variety of ways, such as using accelerometers, gyroscopes, or optical sensors, and this data may be used as interaction with software applications in addition to data collected from tethers 810a-n as described below. In some embodiments, a saddle-like surface on which a user may sit may be used, with motion of the saddle-like surface measured as described generally herein.

As a user moves, his or her body naturally shifts position and orientation. These shifts may be detected and measured via tethers 810a-n, for example by detecting patterns of tension or strain on tethers 810a-n to indicate body orientation, or by measuring small changes in strain on tethers 810a-n to determine more precise movements such as body posture while a user is speaking, or specific characteristics of a user's stride or gait. Additionally, through varying the quantity and arrangement of tethers 810a-n, more precise or specialized forms of movement may be detected and measured (such as, for example, using a specific arrangement of multiple tethers connected to a particular area of a user's body to detect extremely small movements for medical diagnosis or fitness coaching). This data may be used as interaction with software applications, such as for virtual reality applications as input for a user to control a character in a game. In such an arrangement, when a user moves, this movement may be translated to an in-game character or avatar to convey a more natural sense of interaction and presence. For example, in a multiplayer roleplaying game, this may be used to facilitate nonverbal communication and recognition between players, as their distinct mannerisms and gestures may be conveyed in the game through detection of natural torso position and movement. In fitness or health applications, this data may be used to track and monitor a user's posture or ergonomic qualities, or to assist in coaching them for specific fitness activities such as holding a pose for yoga, stretching, or proper running form during use with a treadmill. In medical applications, this data may be used to assist in diagnosing injuries or deficiencies that may require attention, such as by detecting anomalies in movement or physiological adaptations to an unrecognized injury (such as when a user subconsciously shifts their weight off an injured foot or knee, without consciously realizing an issue is present).

Through various arrangements of tethers 810a-n and tether sensors (as described below, referring to FIGS. 9-11), it may be possible to enable a variety of immersive ways for a user to interact with software applications, as well as to receive haptic feedback from applications. For example, by detecting rotation, tension, stress, or angle of tethers a user may interact with applications such as virtual reality games or simulations, by using natural body movements and positioning such as leaning, jumping, crouching, kneeling, turning, or shifting their weight in various directions to trigger actions within a software application configured to accept torso tracking input. By applying haptic feedback of varying form and intensity (as is described in greater detail below, referring to FIG. 9), applications may provide physical indication to a user of software events, such as applying tension to resist movement, pulling or tugging on a tether to move or "jerk" a user in a direction, or varying feedback to multiple tethers such as tugging and releasing in varying order or sequence to simulate more complex effects such as (for example, in a gaming use case) explosions, riding in a vehicle, or walking through foliage.

It should be appreciated that while reference is made to virtual reality applications, a wide variety of use cases may be possible according to the embodiment. For example, torso tracking may be used for fitness and health applications, to monitor a user's posture or gait while walking, without the use of additional virtual reality equipment or software.

Figure 9:
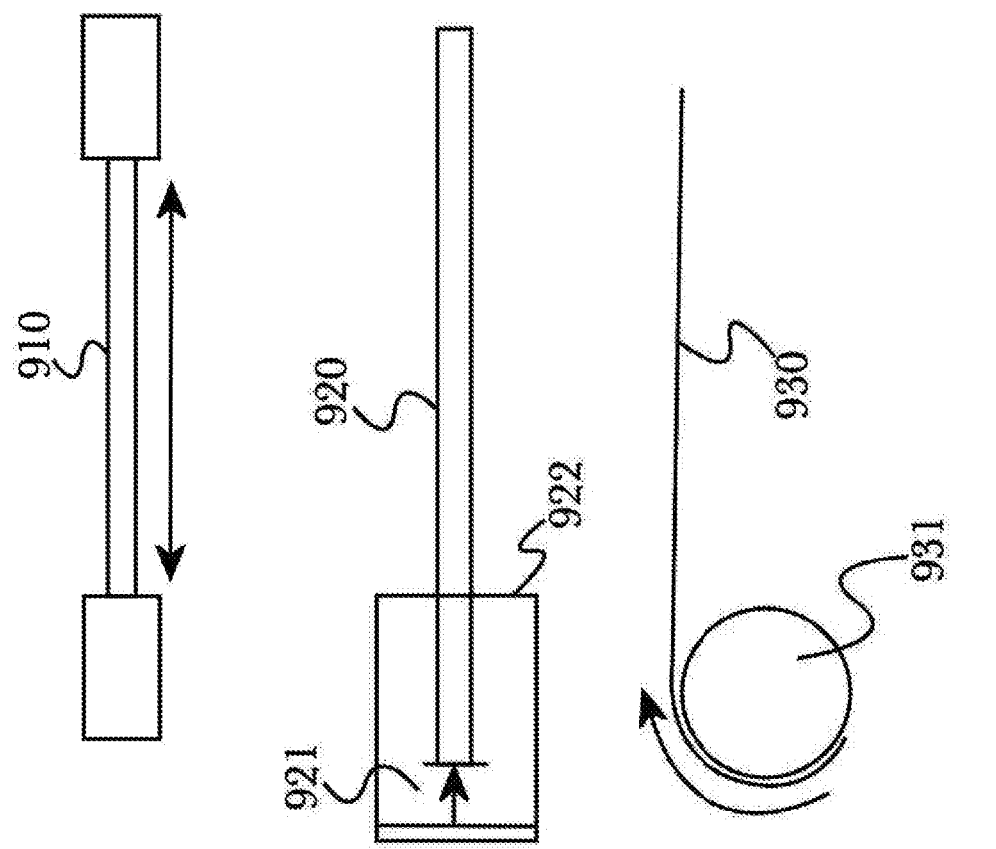
FIG. 9 is a diagram illustrating a variety of alternate tether arrangements.

FIG. 9 is a diagram illustrating a variety of alternate tether arrangements. According to various use cases and hardware arrangements, tethers 810a-n may utilize a variety of purpose-driven designs as illustrated. For example, a "stretchable" tether 910 may be used to measure strain during a user's movement, as the tether 910 is stretched or compressed (for example, using piezoelectric materials and measuring electrical changes). Such an arrangement may be suitable for precise measurements, but may lack the mechanical strength or durability for gross movement detection or prolonged use. An alternate construction may utilize a non-deforming tether 920 such as a steel cable or similar non-stretching material. Instead of measuring strain on the tether 920, instead tether 920 may be permitted a degree of movement within an enclosure 922 (for example, an attachment point on a torso harness 820 or handlebar 830), and the position or movement 921 of the tether 920 may be measured such as via optical sensors. In a third exemplary arrangement, a tether 930 may be wound about an axle or pulley 931, and may be let out when force is applied during a user's movement. Rotation of the pulley 931 may be measured, or alternately a tension device such as a coil spring may be utilized (not shown) and the tension or strain on that device may be measured as tether 930 is extended or retracted. In this manner, it may be appreciated that a variety of mechanical means may be used to facilitate tethers and attachments for use in detecting and measuring natural torso position and movement, and it should be appreciated that a variety of additional or alternate hardware arrangements may be utilized according to the embodiments disclosed herein.

Additionally, through the use of various hardware construction it becomes possible to utilize both "passive" tethers that merely measure movement or strain, as well as "active" tethers that may apply resistance or movement to provide haptic feedback to a user. For example, in an arrangement utilizing a coiled spring or pulley 931, the spring or pulley 931 may be wound to retract a tether and direct or impede a user's movement as desired. In this manner, various new forms of feedback-based interaction become possible, and in virtual reality use cases user engagement and immersion are increased through more natural physical feedback during their interaction.

By applying various forms and intensities of feedback using various tether arrangements, a variety of feedback types may be used to provide haptic output to a user in response to software events. For example, tension on a tether may be used to simulate restrained movement such as wading through water or dense foliage, walking up an inclined surface, magnetic or gravitational forces, or other forms of physical resistance or impedance that may be simulated through directional or non-directional tension. Tugging, retracting, or pulling on a tether may be used to simulate sudden forces such as recoil from gunfire, explosions, being grabbed or struck by a software entity such as an object or character, deploying a parachute, bungee jumping, sliding or falling, or other momentary forces or events that may be conveyed with a tugging or pulling sensation. By utilizing various patterns of haptic feedback, more complex events may be communicated to a user, such as riding on horseback or in a vehicle, standing on the deck of a ship at sea, turbulence in an aircraft, weather, or other virtual events that may be represented using haptic feedback. In this manner, virtual environments and events may be made more immersive and tangible for a user, both by enabling a user to interact using natural body movements and positioning, as well as by providing haptic feedback in a manner that feels natural and expected to the user. For example, if a user is controlling a character in a gaming application through a first-person viewpoint, it would seem natural that when their character is struck there would be a physical sensation corresponding to the event; however, this is not possible with traditional interaction devices, detracting from any sense of immersion or realism for the user. By providing this physical sensation alongside the virtual event, the experience becomes more engaging and users are encouraged to interact more naturally as their actions results in natural and believable feedback, meeting their subconscious expectations and avoiding excessive "immersion-breaking" moments, which in turn reduces the likelihood of users adopting unusual behaviors or unhealthy posture as a result of adapting to limited interaction schema.

Haptic feedback may be provided to notify a user of non-gaming events, such as for desktop notifications for email or application updates, or to provide feedback on their posture for use in fitness or health coaching. For example, a user may be encouraged to maintain a particular stance, pose, or posture while working or for a set length of time (for example, for a yoga exercise application), and if their posture deviates from an acceptable range, feedback is provided to remind them to adjust their posture. This may be used in sports, fitness, health, or ergonomic applications that need not utilize other aspects of virtual reality and may operate as traditional software applications on nonspecialized computing hardware. For example, a user at their desk may use an ergonomic training application that monitors their body posture throughout the workday and provides haptic reminders to correct poor posture as it is detected, helping the user to maintain a healthy working posture to reduce fatigue or injuries due to poor posture (for example, repetitive-stress injuries that may be linked to poor posture while working at a computer).

Figure 10:
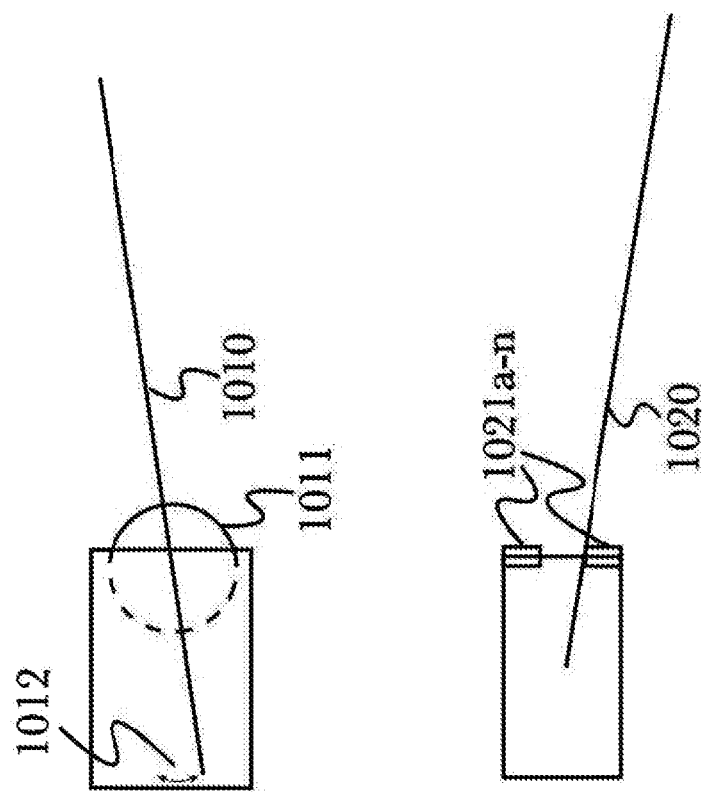
FIG. 10 is a diagram of an additional exemplary hardware arrangement of an apparatus for natural torso tracking and feedback for electronic interaction according to a preferred embodiment of the invention, illustrating the use of angle sensors to detect angled movement of tethers.

FIG. 10 is a diagram of an additional exemplary hardware arrangement 1000 for natural torso tracking and feedback for electronic interaction according to a preferred embodiment of the invention, illustrating the use of angle sensors 1012,1021a-n to detect angled movement of a tether 1020. According to one exemplary arrangement, a tether 1010 may be affixed to or passed through a rotating joint such as a ball bearing 1011 or similar, to permit free angular movement. During movement, the angular movement or deflection 1012 of a protruding bar, rod, or tether segment 1013 may be measured (for example, using optical, magnetic, or other sensors) to determine the corresponding angle of tether 1010. In this manner, precise angle measurements may be collected without impeding range of motion or introducing unnecessary mechanical complexity.

In an alternate hardware arrangement, the use of angle sensors 1021a-n enables tracking of a vertical angle of a tether 1020, to detect and optionally measure vertical movement or orientation of a user's torso. When tether 1020 contacts a sensor 1021a-n, this may be registered and used to detect a general vertical movement (that is, whether the tether is angled up or down). For more precise measurements, the specific hardware construction of a sensor 1021a-n may be varied, for example using a pressure-sensing switch to detect how much force is applied and use this measurement to determine the corresponding angle (as may be possible given a tether 1020 of known construction). It should be appreciated that various combinations of hardware may be used to provide a desired method or degree of angle detection or measurement, for example using a conductive tether 1020 and a capacitive sensor 1021a-n to detect contact, or using a mechanical or rubber-dome switch (as are commonly used in keyboard construction) to detect physical contact without a conductive tether 1020.

The use of angle detection or measurement may expand interaction possibilities to encompass more detailed and natural movements of a user's body. For example, if a user crouches, then all tethers 910a-n may detect a downward angle simultaneously. Additionally, data precision or availability may be enhanced by combining input from multiple available sensors when possible (for example, utilizing adaptive software to collect data from any sensors that it detects, without requiring specific sensor types for operation), for example by combining data from tethers 910a-n and hardware sensors such as an accelerometer or gyroscope, enabling multiple methods of achieving similar or varied types or precision levels of position or movement detection. Similarly, when a user jumps then all tethers may detect an upward angle simultaneously. However, if a user leans in one direction, it may be appreciated that not all tethers 910a-n will detect the same angle. For example, tethers 910a-n in the direction the user is leaning may detect a downward angle, while those on the opposite side would detect an upward angle (due to the orientation of the user's torso and thus a worn torso harness 920). In this manner, more precise torso interaction may be facilitated through improved detection and recognition of orientation and movement. Additionally, it may be appreciated that sensors 1021a-n may be utilized for other angle measurements, such as to detect horizontal angle. For example, if a user is wearing a non-rotating torso harness 920, when they twist their body a similar stress may be applied to all attached tethers 910a-n. Without angle detection the precise nature of this movement will be vague, but with horizontal angle detection it becomes possible to recognize that all tethers 910a-n are being strained in a similar direction (for example, in a clockwise pattern when viewed from above, as a user might view tethers 910a-n during use), and therefore interpret the interaction as a twisting motion (rather than, for example, a user squatting or kneeling, which might apply a similar stress to the tethers 910a-n but would have different angle measurements).

Figure 11:
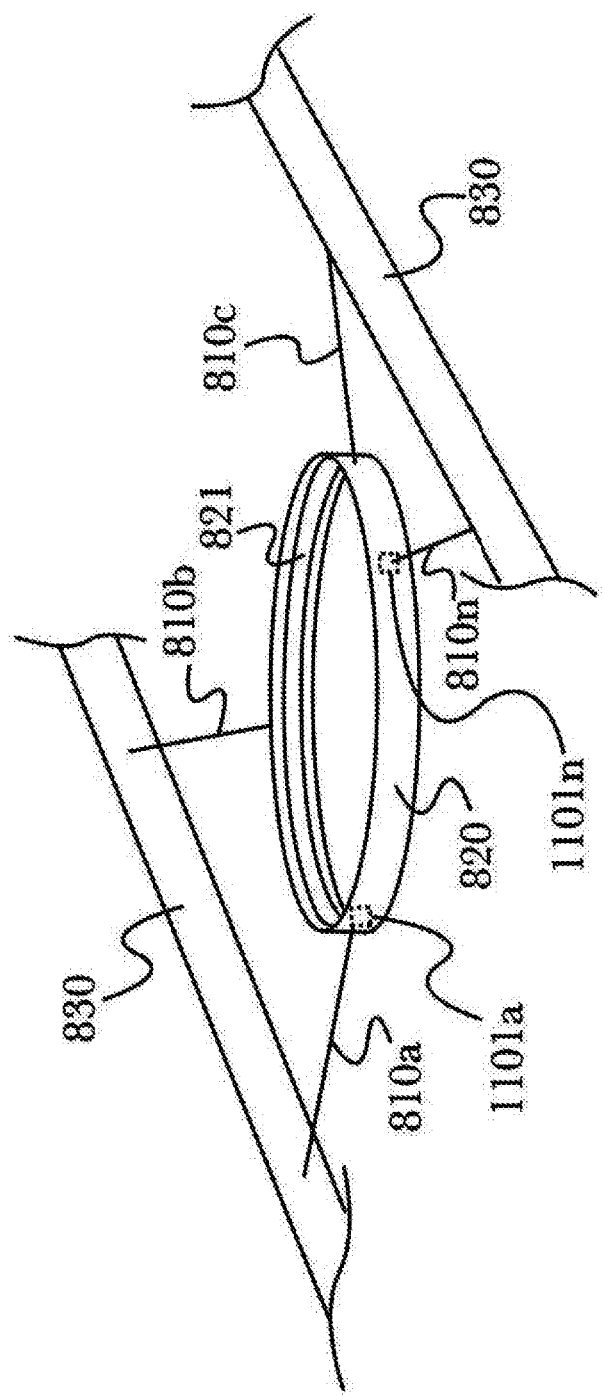
FIG. 11 is a diagram illustrating an exemplary hardware arrangement of an apparatus for natural torso tracking and feedback for electronic interaction according to a preferred embodiment of the invention, illustrating the use of multiple tethers and a movable torso harness comprising a plurality of angle sensors positioned within the movable torso harness.

FIG. 11 is a diagram illustrating an exemplary hardware arrangement of an apparatus for natural torso tracking and feedback for electronic interaction according to a preferred embodiment of the invention, illustrating the use of multiple tethers 810a-n and a movable torso harness 820 comprising a plurality of angle sensors 1101a-n positioned within the movable torso harness 820. According to the embodiment, a plurality of tethers 810a-n may be affixed or integrally-formed as part of a handle or railing 830, such as handlebars found on exercise equipment such as a treadmill, elliptical trainer, stair-climbing machine, or the like. In alternate arrangements, specifically-designed equipment with affixed or integral tethers 810a-n may be used, but it may be appreciated that a modular design with tethers 810a-n that may be affixed and removed freely may be desirable for facilitating use with a variety of fitness equipment or structural elements of a building, according to a user's particular use case or circumstance as well as weight-holding strength of the tethers. Tethers 810a-n may then be affixed or integrally-formed to angle sensors 1101a-n placed within or integrally-formed as a component of torso harness 820 (as illustrated in the form of a belt) that may be worn by a user such that movement of their body affects tethers 810a-n and applies detectable or measurable stress to tethers 810a-n and angular motion to angle sensors 1101a-n. In this manner, it may be appreciated that angle sensors 1101a-n may be utilized as integral or removable components of a torso harness 820, as an alternative arrangement to utilizing angle sensors 1101a-n placed or formed within railings 830 or other equipment components connected to distal ends of tethers 810a-n (with respect to the user's torso). According to various embodiments, sensors may be placed optionally on a belt, harness, or saddle-like surface or at attachment points on safety railings, or indeed both.

Figure 12:
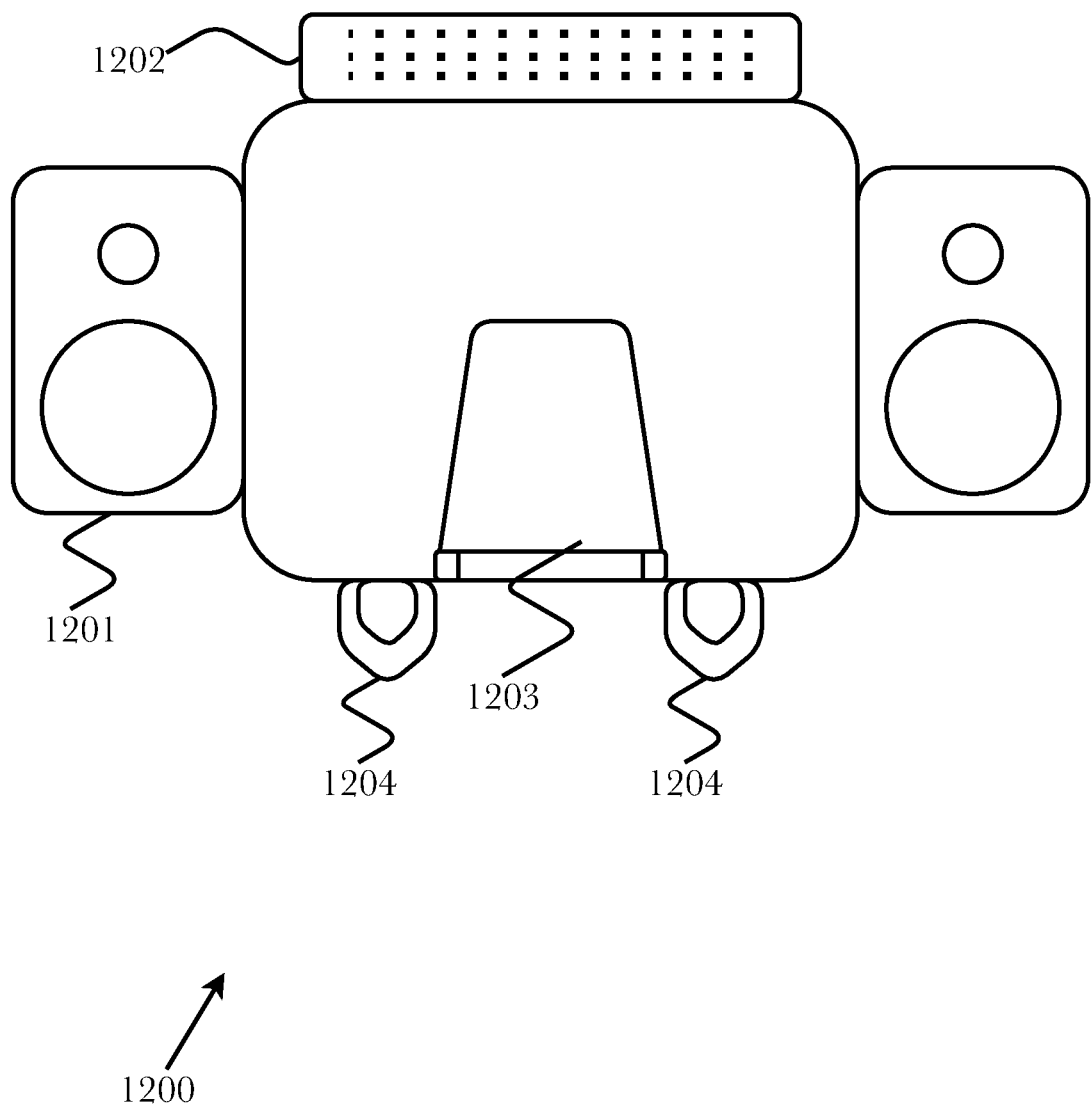
FIG. 12 is a diagram of an exemplary brainwave entrainment therapy device that can be attached to a variable-resistance exercise machine with network communication for smart device control and interactive software applications, according to some embodiments.

FIG. 12 is a diagram of an exemplary brainwave entrainment therapy device 1200 that can be attached to a variable-resistance exercise machine with network communication for smart device control and interactive software applications 100, according to some embodiments. In this embodiment, the brainwave entrainment therapy device 1200 comprises one or more lights 1202, one or more speakers 1201, a shelf or platform 1203 for safe placement of a smart device, and one or more adjustable clips or mounting hardware 1204 for affixing the brainwave entrainment device 1200 to a variable-resistance exercise machine 100. The lights 1202, shown here as light bars comprising multiple light-emitting diodes (LEDs) can be programmed to emit a visible stimulus (e.g., flashes, on/off cycles, etc.) at frequencies appropriate for brainwave entrainment. According to some embodiments, the one or more lights 1202 may comprise LEDs configured to emit a spectrum of wavelengths (e.g., different colors of light). The speakers 1201 can be programmed to emit an audible stimulus (e.g., rectangular wave sound pulses, sine wave sound oscillations, etc.) at frequencies appropriate for brainwave entrainment. In some configurations, both light and sound may be used as stimuli. The stimuli need not be from the same source (e.g., two light sources each at 20 Hz could be synchronized to produce 40 Hz stimulus) or from the same modality (e.g., a sound source at 15 Hz and a light source at 15 Hz could be synchronized to produce 30 Hz stimulus). The inclusion of one or more lights 1202 and one or more speakers 1201 in the brainwave entrainment therapy device 1200 allows for an exercise machine user the simultaneous use of their personal smart device for media playback purposes while also permitting brainwave entrainment via the device 1200. For example, an exercise machine user may be able to listen and/or view a podcast on their smart device while also receiving brainwave entrainment via flashing the lights 1202 in a periodic manner with a set frequency (e.g., 40 Hz).

The device of this embodiment is designed such that it can be mounted on an exercise machine, whereby it can be used to provide brainwave entrainment therapy. One or more adjustable clips 1204 may be present which allows for device 1200 to be mounted in different positions on the exercise machine. For example, brainwave entrainment therapy device 1200 may be mounted on a rigid handlebar 103 affixed or integrally-formed on one end of exercise machine 100 such that an exercise machine user may be facing the device 1200 when using the exercise machine 100. For example, brainwave entrainment therapy device 1200 may be mounted on formed or removable supports 106a-b and/or right 201a and left 201b handrails such that an exercise machine user may be facing the device when performing exercise actions where the user is facing a direction perpendicular to the variable-resistance exercise machine 100 treads 203a-b. In this way, variable-resistance exercise machine with network communication for smart device control and interactive software applications 100 may provide brainwave entrainment therapy via brainwave entrainment therapy device 1200 regardless of the exercise machine user's position. In some embodiments, device 1200 may be integrally formed and permanently mounted to rigid handlebar 103.

The brainwave entrainment therapy device 1200 may be communicatively coupled, via a network interface (e.g., WiFi, BLUETOOTH™, etc.), with a user smart device and/or a variable-resistance exercise machine 100 such that the lights 1202 and the speakers 1201 may produce brainwave entrainment therapy stimuli responsive to received inputs and/or outputs from at least one of the variable-resistance exercise machine 100, the network interface, or the user smart device. Interactive software applications, operating on the smart device, may be configured to control and provide stimulation signals to the one or more speakers 1201 and lights 1202 to provide brainwave entrainment therapy to users of a variable-resistance exercise machine with network communication for smart device control and interactive software applications 100. For example, a user may utilize their smart device to control the exercise machine 100 and to select one or more brainwave entrainment therapies from a plurality of pre-configured brainwave entrainment therapies stored in the interactive software application. In some embodiments, the user (or a coach, trainer, physical therapist, etc.) may configure their own brainwave therapy sessions. For example, a physical therapist may select the type of stimulus (e.g., audible, visual, etc.), the intensity, any possible neurodegenerative conditions or diseases the patient may have, and the duration that the stimulus is produced in conjunction with a physical therapy session including the variable-resistance exercise machine 100.

According to some embodiments, brainwave entrainment therapy device 1200 may be configured to provide stimulation in response to input from a user device. For example, a network interface may receive input from a user device, such as an interaction received via an interaction software application, and enable stimulation to be produced from the brainwave entrainment device 1200 based on the received input. For example, a user selects an auditory brainwave entrainment therapy session from an interactive software application operating on her smart device, the user's selection is received by the network interface, and the network interface communicates the therapy session configurations to entrainment device to enable stimulation via the one or more lights 1202 and/or the one or more speakers 1201, or other transducers. In some embodiments, the interactive software application may comprise a signal generator capable of producing a plurality of signals of varying wavelengths, amplitudes, frequencies, magnitudes, irradiance, phases, and offsets, in order to provide stimulation appropriate for the brainwave entrainment application. In some other embodiments, brainwave entrainment device 1200 may be configured to receive, via network interface, sensor output and produce stimulation responsive to the sensor output. For example, stimulation may only be produced if pressure sensors indicate that a user is currently on the exercise machine 100.

In some embodiments, the brainwave entrainment therapy device 1200 may comprise a plurality of transducers which may be configured to produce stimulating signals responsive to interaction input from a user smart device and/or output from a network interface. According to some embodiments, transducers may be configured to provide stimulation such as visual, auditory, vibratory, or electrical stimulation. According to some embodiments, the stimulation frequency may be between 0.5 Hz and 100 Hz.

According to some embodiments, two devices 1200 may be attached to exercise machine 100. In this embodiment, a device 1200 may be attached on the front of exercise machine 100 to a rigid handlebar 103 and on the side of the exercise machine to right 201a and left 201b handrails. According to this embodiment, sensors in the exercise machine 100 and/or in harness 820 may be used to determine the movement and position of a user of exercise machine 100. In this embodiment, network interface may receive the sensor data and may change which of the two attached devices 1200 to produce stimulations from. For example, a user is walking on the exercise machine 100 while facing forward and the network interface instructs the forward mounted device produce visual stimulation as part of brainwave entrainment, and when the user turns sideways and begins to do a side-shuffle exercise the sensors in the exercise machine 100 and/or the harness 820 may indicate the user has changed position and the network interface recognizes the change in position and instructs the side device to begin producing the visual stimulation.

Figure 13:
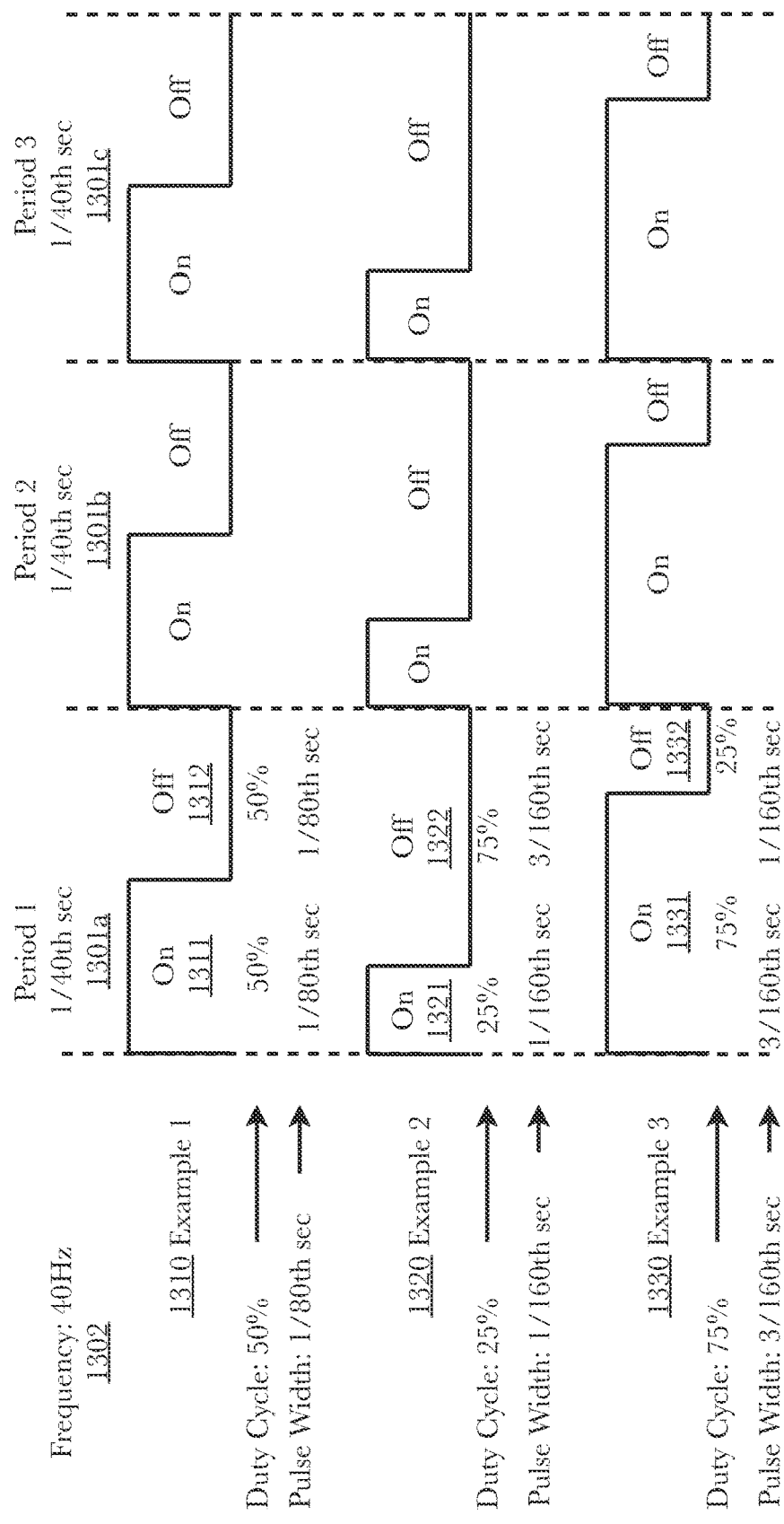
FIG. 13 is a diagram showing explaining the use of duty cycles and pulse width modulations in applying brainwave entrainment.

FIG. 13 is a diagram showing the use of duty cycles and pulse width modulations in applying brainwave entrainment. Here, three examples 1310, 1320, and 1330 of duty cycles/pulse width modulation are shown. The frequency of stimulation 1302 in all three examples is 40 Hz (40 cycles per second), and the wave form of each example is a rectangular wave (i.e., instantaneous or near-instantaneous changes between on and off states). Three periods 1301a-c of the stimulation at the 40 Hz frequency 1302 are shown, each period corresponding to one full on/off cycle lasting $1/40^{th}$ of one second. In Example 1 1310, a duty cycle of 50% is shown in which the stimulation is in an on state 1311 for 50% of the period and in an off state 1312 for 50% of the period. For a 40 Hz frequency as shown here, this corresponds to a pulse width of $1/80^{th}$ of a second, wherein the stimulation is in an on state 1311 for $1/80^{th}$ of a second and in an off state 1312 for $1/80^{th}$ of a second. In Example 2 1320, a duty cycle of 25% is shown in which the stimulation is in an on state 1321 for 25% of the period and in an off state 1322 for 75% of the period. For a 40 Hz frequency as shown here, this corresponds to a pulse width of $1/160^{th}$ of a second, wherein the stimulation is in an on state 3721 for $1/160^{th}$ of a second and in an off state 1322 for $3/160^{th}$ of a second. In Example 3 1330, a duty cycle of 75% is shown in which the stimulation is in an on state 1331 for 75% of the period and in an off state 1332 for 25% of the period. For a 40 Hz frequency as shown here, this corresponds to a pulse width of $3/160^{th}$ of a second, wherein the stimulation is in an on state 1331 for $3/160^{th}$ of a second and in an off state 1332 for $1/160^{th}$ of a second.

Figure 14:
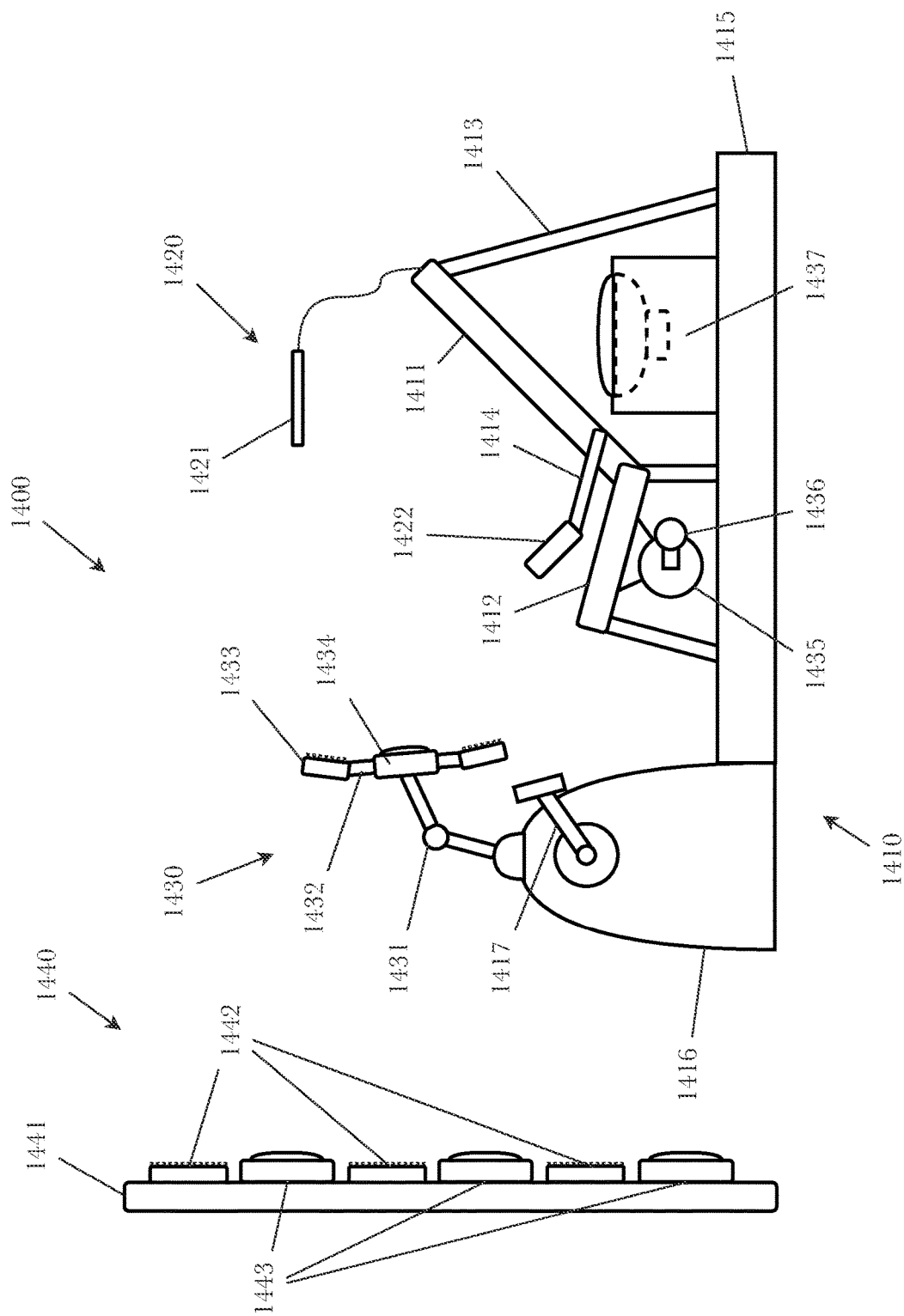
FIG. 14 is a diagram of an exemplary brainwave entrainment therapy system for targeted brainwave entrainment therapy that allows for multi-modal, multi-intensity treatment using dual-tasking methodologies.

FIG. 14 is a diagram of an exemplary brainwave entrainment therapy system for targeted brainwave entrainment therapy that allows for multi-modal, multi-intensity treatment using dual-tasking methodologies. The system 1400 of this embodiment comprises a stationary recumbent bicycle 1410, and three different scales of brainwave entrainment stimulators: localized and/or individual stimulation transducers 1420, small area stimulation transducers 1430, and large area stimulation transducers 1440.

The stationary recumbent bicycle 1410 comprises a base 1415, a chair back 1411, a seat 1412, arm rests 1414, a plurality of supports 1413 connecting the chair back 1411 and seat 1412 to the base 1415, a resistance mechanism 1416 allowing for resistance to a pedaling motion of the user, and a pedal system 1417 for the user to pedal in a cycling motion. The stationary recumbent bicycle 1410 thus provides the means for the user to engage in a physical task for dual task stimulation (and/or dual task assessment).

The localized and/or individual stimulation transducers 1420 of this embodiment are a headband 1421 with vibratory stimulation and hand grips 1422 which provide electrical stimulation. These provide localized stimulation which can only be perceived by the user, which also makes them individual stimulation transducers (as opposed to the other scales, which can be perceived by others, and which could be used to provide brainwave entrainment to more than one person using the same transducer(s)). The headband may produce simple vibratory (i.e., tactile) stimulation to the head, or may be configured to produce vibrations at certain locations on the head and at certain intensities so as to be perceptible by the middle and inner ear, which causes the stimulation to be both tactile and auditory in nature. This double stimulation (tactile and auditory) amplifies the effect of a single type of transducer, increasing the efficiency of brainwave entrainment from applications of that transducer.

The small area stimulation transducers 1430 of this embodiment are devices attached to the exercise machine 1410 (or variable-resistance exercise machine 100), but not directly attached to or in contact with the user. For example, a console comprising a screen 1432, light bars 1433, and speakers 1434 similar to that of the device of FIG. 17 may be used. The console may be attached to the exercise machine using an adjustable arm 3432 that allows for optimal positioning of the console for viewing and/or interaction by the user. Other small area stimulation transducers include a large electric motor 3435 with an offset weight 3436 attached to the seat 3412 that allows for full-body vibratory stimulation to be applied, and a subwoofer 3437 under the chair back 3411 that allows for both audible (regular sound) and inaudible (infrasound) stimulation to be applied. Small area stimulation transducers are particularly useful in situations where direct contact with a user is not desirable, or when multiple users will be using the device sequentially, or when brainwave entrainment will be applied to a small number of users (e.g., those directly in front of the stimulation transducers).

The large area stimulation transducers 1440 of this embodiment are devices that can be used over a large area and potentially a large number of persons such as a room or auditorium. In this embodiment, The large area stimulation transducers are large LED light bars 1442 and large speakers 1443 attached to a wall 1441 of the room in which the stimulation will be applied. The large area stimulators such as the LED light bars 1442 and large speakers 1443 on the wall 1441 can be used to fully immerse the user in intense brainwave entrainment with large areas of bright light and loud, booming sounds. The immersion and intensity can be enhanced, for example, by surrounding the user with large area stimulators on walls on all sides (and possibly ceilings and floors) covering the user's entire visual area, so that the user receives visual stimulation no matter in which direction the user looks an auditory stimulation no matter where the user is located. Higher immersion and intensity may provide greater beneficial effects from brainwave entrainment.

It is important to note that any type of transducer can be applied at any scale. For example, light stimulation can be configured such that it is seen only by one person (e.g., in glasses or goggles), or is seen by a small number of persons (e.g., a single LED light bar), or is seen by many people (e.g. room lights, stadium lights, etc.). Further, the intensity of stimulation can be largely varied separately from the scale of stimulation. However, depending on the circumstances and application, brainwave entrainment at certain scales and/or intensities may be more useful or effective than at others.

The different scales of stimulation transducers allow for a choice of the level of immersion the user experiences with respect to the brainwave entrainment, and to some degree, the level of intensity of the brainwave entrainment. Immersion is the quality of being surrounded by or absorbed in an experience. Intensity is the magnitude of the experience. They are separate qualities (e.g., a localized electric stimulation can be intense, but not immersive), but there can be an increase in intensity with an increase in scale (for example, if light stimulation comes from all directions, it will tend to be both more immersive and more intense, although the intensity of the lights can be reduced to offset this tendency). For example, a localized, subtle electrical stimulation through electrically-conducting hand grips 1422 provides minimal immersion of the user in the brainwave entrainment. This may be useful, for example, where intense concentration on the dual task stimulation is necessary. Small area stimulation transducers such as the LED light bars 1433 on the screen console are useful for mid-level immersion and mid-level intensity of brainwave entrainment. The LED light bars 1433 cover a small, but significant, area of the user's view, and the speakers 1434 are large enough to provide a substantial auditory stimulus. The large area stimulators such as the LED light bars 1442 and large speakers 1443 on the wall 1441 can be used to fully immerse the user in intense brainwave entrainment with large areas of bright light and loud, booming sounds. The immersion and intensity can be enhanced, for example, by surrounding the user with large area stimulators on walls on all sides (and possibly ceilings and floors) covering the user's entire visual area, so that the user receives visual stimulation no matter in which direction the user looks an auditory stimulation no matter where the user is located. Higher immersion and intensity may provide greater beneficial effects from brainwave entrainment.

Further, it is important to note that the modalities (types of stimulation), scales, and intensities allows for tremendous flexibility in selecting suitable therapies regimens for different situations. For high-immersion scenarios (e.g., maximum brainwave entrainment with fewer cognitive demands such as listening to music), multiple modalities, scales, and intensities may be used at the same time. For example, while a user is listening to classical music, localized electrical stimulation may be applied to the wrist, small area visual stimulation may be applied using a single LED light bar, and large area tactile stimulation may be applied using subwoofers which produce sounds (infrasounds) which are inaudible to the human ear but can be perceived through the sense of touch (e.g., as oscillating pressure on the torso).

Further, modalities can be chosen to either amplify certain tasks or activities or to supplement them. For amplification, treatment modalities are chosen to include those corresponding to a given task or activity in dual task stimulation. As an example, if a dual task stimulation activity assigned to a user is listening to music, a 40 Hz auditory signal can be used as gamma entrainment therapy. As the user is already focused on listening, the user is focusing more intensely on auditory activities (and the brain areas and functions associated with auditory activities are stimulated), enhancing the effect of the auditory gamma entrainment modality. For supplementation, treatment modalities are chosen to exclude those corresponding to a given task or activity in dual task stimulation. As an example, if a dual task stimulation activity assigned to a user is listening to specific songbirds for the purpose of identifying or counting them, adding a 40 Hz auditory signal may interfere with the listening process, thus either disrupting the dual task stimulation or causing the gamma entrainment to be ineffective. In such circumstances, a non-conflicting modality may be chosen such as light therapy or vibratory therapy.

Figure 15:
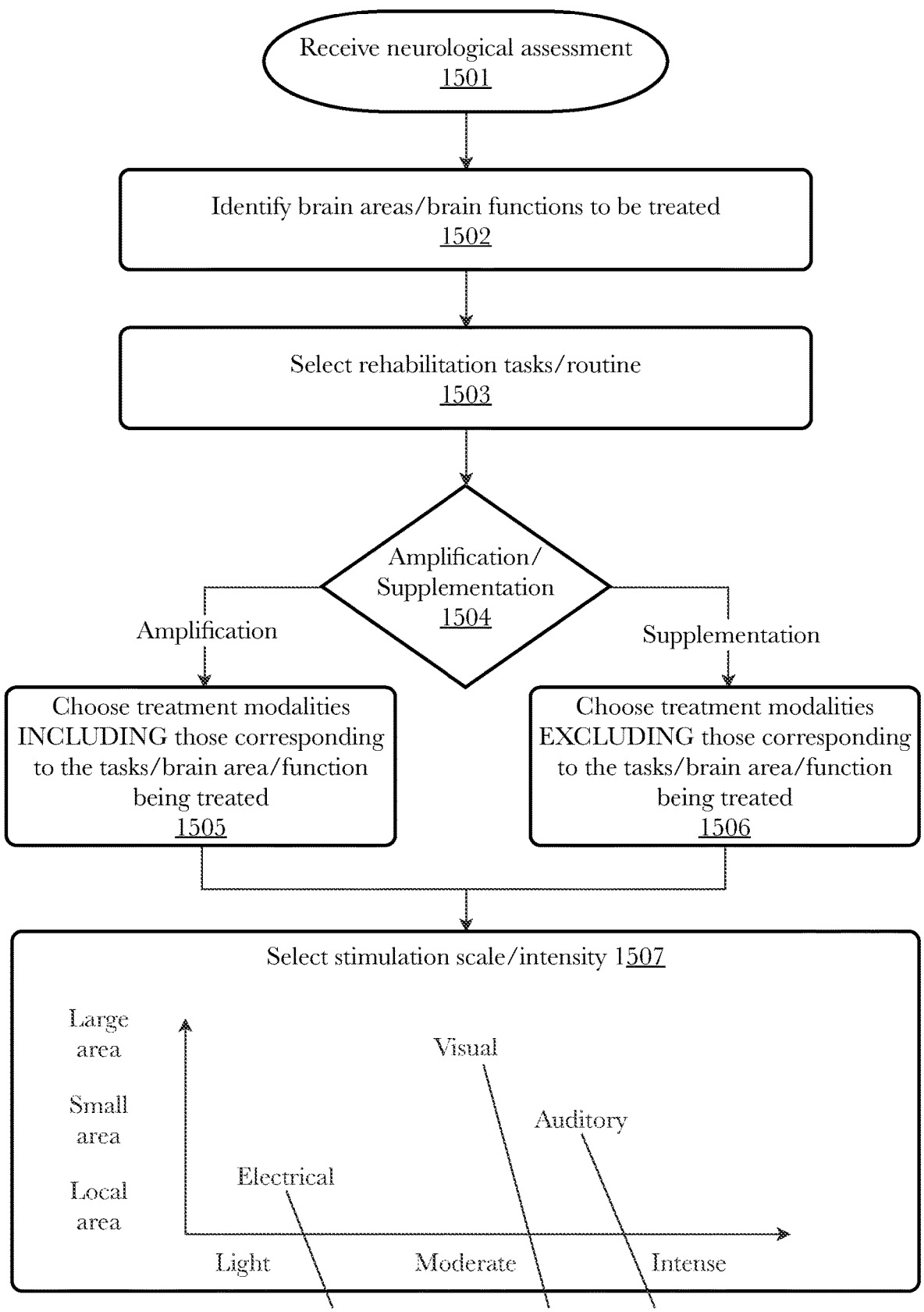
FIG. 15 is a flow diagram showing an algorithm for selection of modalities and routines for targeted brainwave entrainment therapy using dual-tasking methodologies.

FIG. 15 is a flow diagram showing an algorithm for selection of modalities and routines for targeted brainwave entrainment therapy using dual-tasking methodologies. As a first step, a neurological assessment is received 1501, comprising an evaluation of neurological function of at least one aspect of an individual. The neurological assessment may be in any number of different forms. One possible form is a report of a physician or other health professional identifying a deficiency in neurological function such as a cognitive or motor-physical decline associated with neurological disease or degradation. Another possible form is a report from a coach or other sports professional recommending an improvement in some area of training or physical performance. Another possible form is the results of a dual task assessment. After the neurological assessment is received, the areas of the brain or neurological functions to be treated are identified 1502. Where the neurological assessment is a dual task assessment or obvious neurological deficiency (i.e., disease or degradation), the deficient neurological functions will be known and brain areas associated with those neurological functions may also be known. Where the neurological assessment is a training or physical performance improvement recommendation, a neurological function may be selected which is believed to be associated in some form with that recommended improvement.

A treatment regimen is then created by selecting appropriate dual task stimulation to stimulate the areas of the brain to be treated 1503, selecting amplification or supplementation 1504 as appropriate for the dual task stimulation, choosing appropriate treatment modalities (e.g., light therapy, sound therapy, vibrational therapy, electrical therapy, or combinations of such modalities) either for amplification 1505 (treatments including those corresponding to the tasks, activities, or neurological function) or for supplementation 1506 (treatments including those corresponding to the tasks, activities, or neurological function), and selecting a stimulation scale and intensity 1507 for each modality appropriate for the treatment goals. In this example, three modalities are shown with different scales and intensities, localized electrical stimulation at a light intensity 1507a, large area visual stimulation at a moderate intensity 1507b, and small area auditory stimulation at a moderately intense intensity 1507c. Brainwave entrainment is then applied using the chosen regimen, providing targeted treatment of particular areas of the brain and/or particular neurological functions via stimulation of those areas or functions using dual task stimulation.

Figure 16:
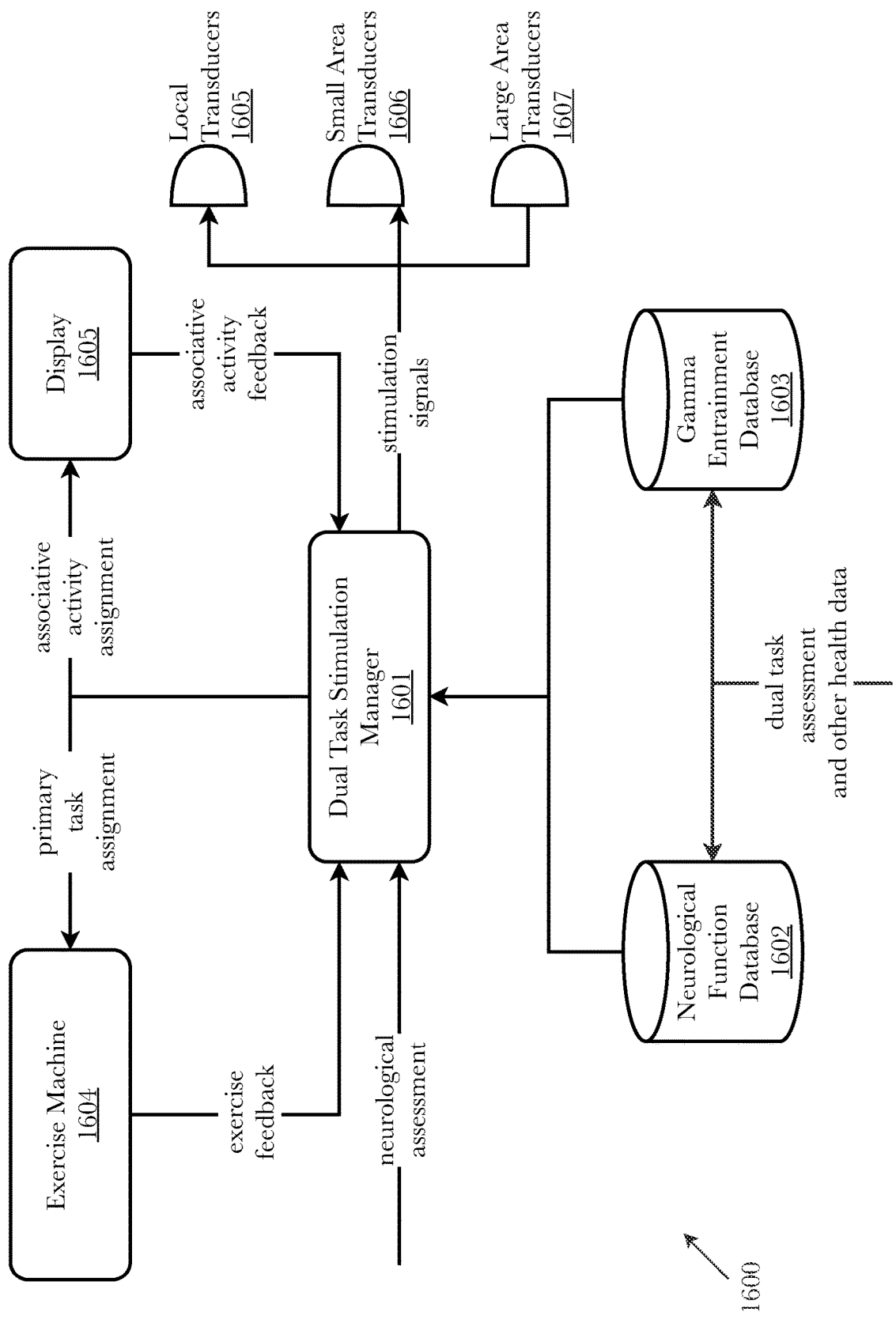
FIG. 16 is a diagram showing an exemplary system architecture diagram for targeted brainwave entrainment therapy using dual-tasking methodologies.

FIG. 16 is a diagram showing an exemplary system architecture diagram for targeted brainwave entrainment therapy using dual-tasking methodologies. In this embodiment, the system architecture 1600 comprises a dual task stimulation manager 1601, a neurological function database, a brainwave entrainment database, an exercise machine 1604, and three scales of transducers, localized stimulation transducers 1605, small area stimulation transducers 1606 and large area stimulation transducers 1607.

The dual task stimulation manager 1601 is responsible for receiving neurological assessments, each comprising a neurological condition to be treated, and creating therapy regimens to treat the neurological condition. The neurological assessment may be in any number of different forms. One possible form is a report of a physician or other health professional identifying a deficiency in neurological function such as a cognitive or motor-physical decline associated with neurological disease or degradation. Another possible form is a report from a coach or other sports professional recommending an improvement in some area of training or physical performance. Another possible form is the results of a dual task assessment. It is important to note that a neurological assessment does not necessarily mean an assessment of a deficiency. It may note normal function, but indicate a neurological condition for improvement. The dual task manager 1601 creates a therapy regimen based on the neurological condition by consulting the neurological database 1602 and the brainwave entrainment database.

The neurological database 1602 is a database containing information that associates neurological conditions with primary tasks and associative activities (i.e., dual tasking tasks and their associated activities). This database may be developed from pre-existing information or may be built up over time from dual task assessments. The brainwave entrainment database 1603 is a database of information about brainwave entrainment therapies (i.e., modalities, immersion, intensity, and stimulation frequencies) tending to be more or less effective under certain conditions and in certain situations, including conditions and situations associated with dual task stimulation. The brainwave entrainment database may likewise be developed from pre-existing information or may be built up over time from dual task assessments. Importantly, both the neurological database 1602 and the brainwave entrainment database may store neurological assessment data for particular individuals over time, and use the results of the neurological assessments of each such individual to create therapy regimens for that individual. This provides concrete information about the effectiveness of created therapy regimens on a given individual, and allows for future therapy regimens to be adjusted to meet the needs of that individual.

Once a therapy regimen is created, the dual task stimulation manager assigns dual task stimulation to the individual undergoing treatment comprising a primary task and an associative task. In this case the primary task involves exercise on an exercise machine 1604, and the associative task involves solving puzzles on a display 1605. The exercise machine provides feedback to the dual task stimulation manager 1601 as to whether the primary task is being performed, and the display provides feedback as to whether the associative activity is being performed. While the dual task stimulation is being performed, the dual task stimulation manager sends signals to the appropriate transducers 1605-1607 to operate them according to the appropriate stimulation frequency.

Figure 17:
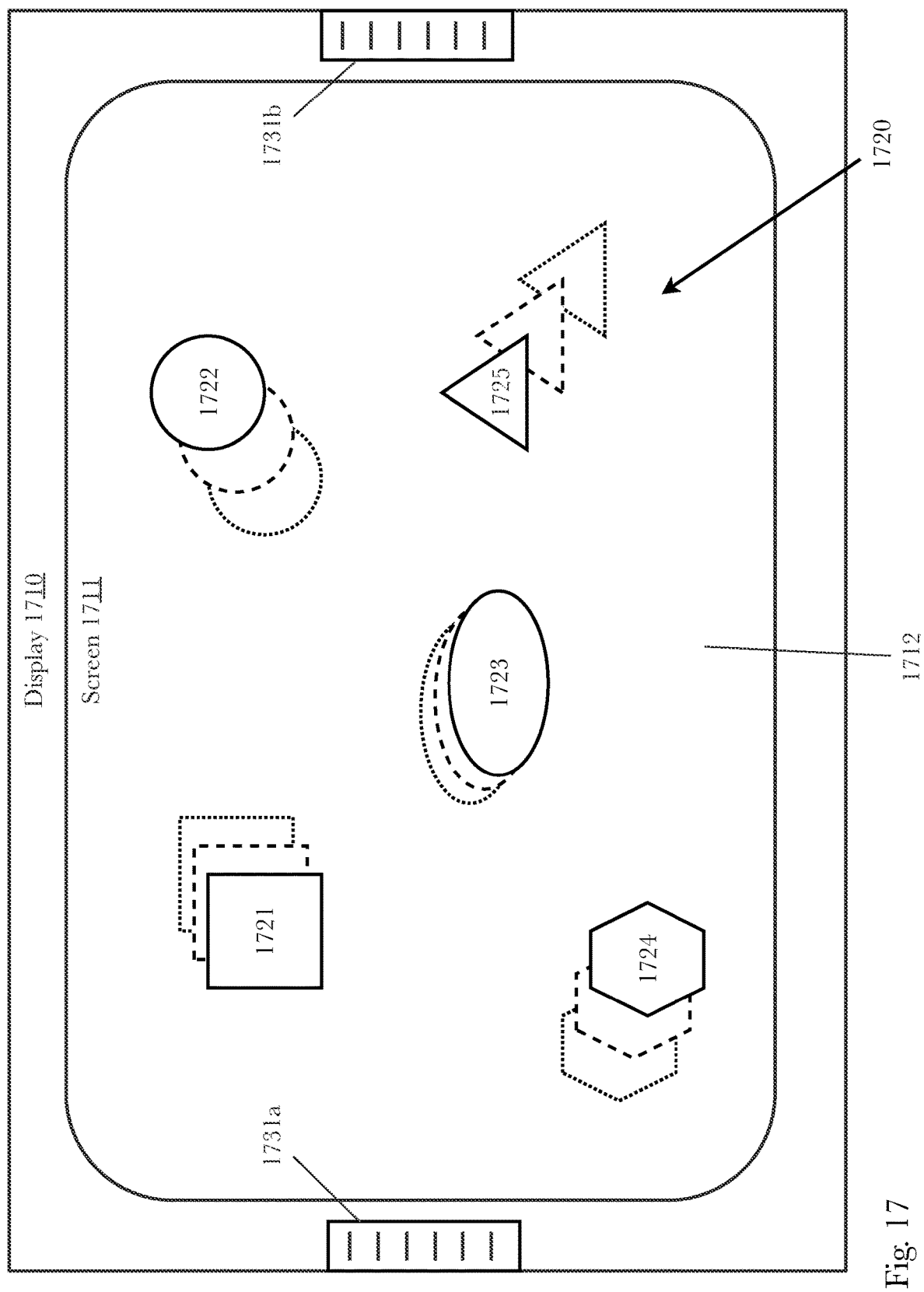
FIG. 17 is a diagram showing an embodiment in which on-screen elements of a display are used to apply brainwave entrainment.

FIG. 17 is a diagram showing an embodiment in which on-screen elements of a display are used to apply brainwave entrainment. In this example, brainwave entrainment is implemented using a display 1710, such as a television computer monitor, or tablet-based device, comprising a screen 1711 and in some configurations, built in speakers 1731*a,b*. In this embodiment, the screen is used to provide visual brainwave entrainment, either by flashing the background of the screen 1712 or one or more on-screen elements 1720. This embodiment enables the provision of brainwave entrainment without the use of (or in addition to) external devices such as lights and speakers. In this example, five on-screen elements are shown 1721-1725, each comprising a different shape and each moving independently on the screen 1711 as indicated by the dashed and dotted "movement shadows" associated with each on-screen element. The on-screen elements 1780 are generic shapes in this diagram, but may represent any type of on-screen element whether static or movable, permanent or transient. Depending on the configuration, the on-screen element may be any shape or color displayable on a screen, such as game elements, puzzle elements, background elements, regular or irregular portions of the screen. Many possible applications of this embodiment are possible. The built-in speakers, if any, may be used to provide auditory brainwave entrainment in addition to the visual on-screen brainwave entrainment.

For example, when paired with a camera and eye-tracking software, the on-screen elements might represent an eye muscle strengthening exercise combined with brainwave entrainment, wherein the user is asked to find a target on-screen element with a particular shape and follow the shape with his or her eyes. At the same time the target element may flash a particular color at a selected brainwave entrainment frequency, with the color changing as the user's eyes either follow the target on-screen element or stray from it. The target on-screen element may, for example, be a pleasant light-blue color while the user's eyes are following it, and change to a bright red to re-attract the user if the user's eyes start following a different on-screen element.

In another use case, the on-screen elements 1720 may represent a puzzle or game, and the brainwave entrainment may be provided by simply flashing the screen background 1712 at a selected brainwave entrainment frequency.

While not shown here, this example may be extended to virtual reality applications, wherein brainwave entrainment is provided by flashing in-game elements within the virtual reality environment.

Figure 18:
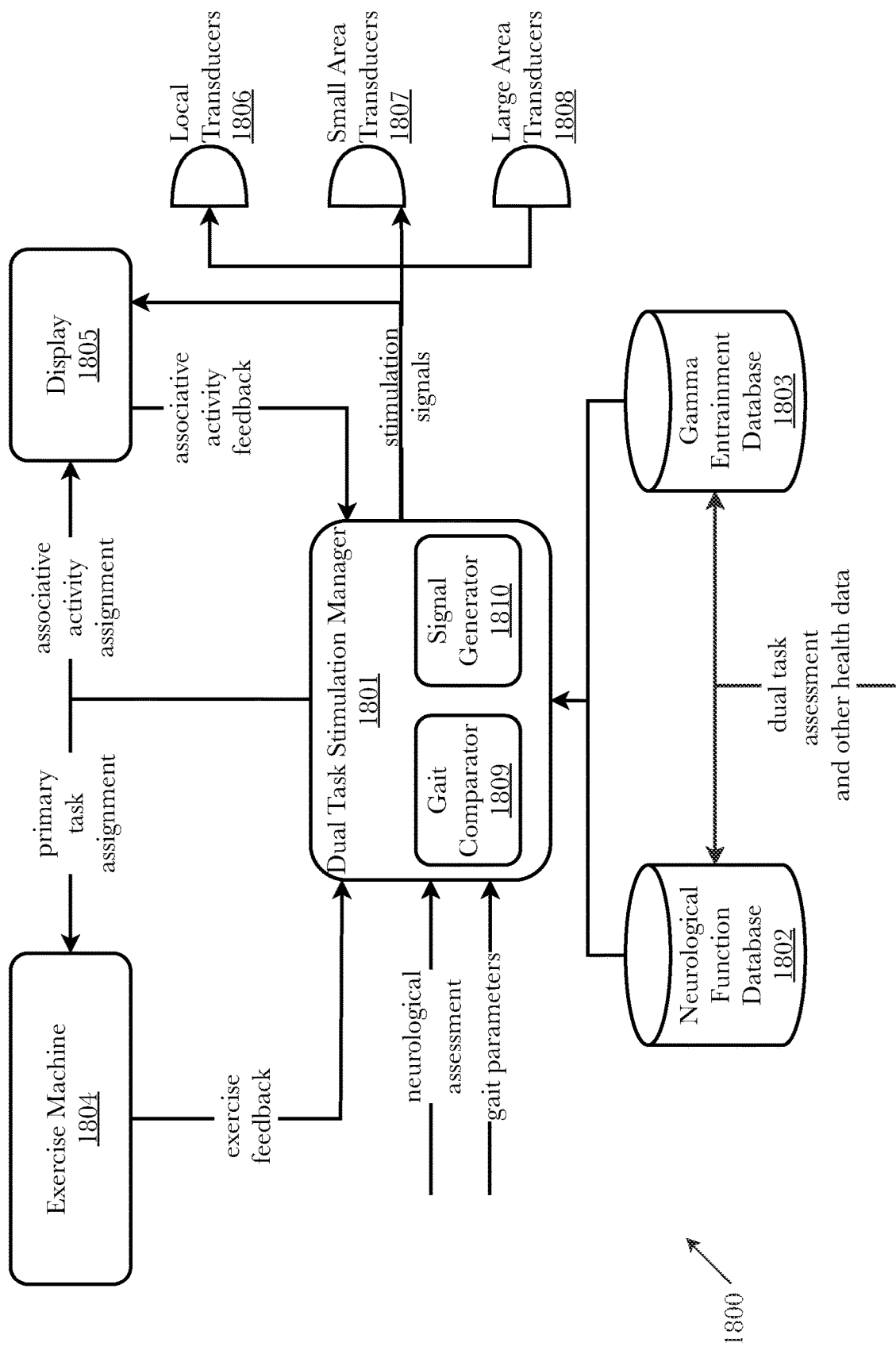
FIG. 18 is a diagram showing an exemplary system architecture diagram for targeted brainwave entrainment therapy with passive treatment of neurodegenerative conditions using dual-tasking methodologies.

FIG. 18 is a diagram showing an exemplary system architecture diagram for targeted brainwave entrainment therapy with passive treatment of neurodegenerative conditions using dual-tasking methodologies. In this embodiment, the system architecture 1800 comprises a dual task stimulation manager 1801, a neurological function database, a brainwave entrainment database, an exercise machine 1804, and three scales of transducers, localized stimulation transducers 1806, small area stimulation transducers 1807 and large area stimulation transducers 1808.

The dual task stimulation manager 1801 is responsible for receiving neurological assessments, each comprising a neurological condition to be treated, and creating therapy regimens to treat the neurological condition. The neurological assessment may be in any number of different forms. One possible form is a report of a physician or other health professional identifying a deficiency in neurological function such as a cognitive or motor-physical decline associated with neurological disease or degradation. Another possible form is a report from a coach or other sports professional recommending an improvement in some area of training or physical performance. Another possible form is the results of a dual task assessment. It is important to note that a neurological assessment does not necessarily mean an assessment of a deficiency. It may note normal function, but indicate a neurological condition for improvement. The dual task manager 1801 creates a therapy regimen based on the neurological condition by consulting the neurological database 1802 and the brainwave entrainment database.

Gait impairment is common in neurodegenerative disorders and conditions. Specifically, gait variability, the stride-to-stride fluctuations in distance and time, has been associated with neurodegeneration and cognitive impairment. Some examples of neurodegenerative disorders that may be associated with an impaired gait include Parkinson disease, mild cognitive impairment, Alzheimer's disease, dementia, Lewy body dementia, and frontotemporal dementia. The systems and methods disclosed within this specification may be well suited for providing gait detection and comparison detected gaits against a database of historical gait data related to the gaits of individuals who are known to be afflicted by a neurodegenerative conditions. Historical gait information may be stored in neurological function database 1802 and received, retrieved, or otherwise obtained by dual task stimulation manager 1801 in order to determine if an individual demonstrates signs of an onset degenerative condition. Historical gait information may include gait patterns, characteristics, or measurements, or each of these, and their associated degenerative condition. Furthermore, passive treatments associated with a degenerative condition may be stored in neurological function database 1802.

There is a wealth of supporting evidence that suggests that stimulating regions of the brain of individuals who have a neurodegenerative condition with a stimulus operating at a frequency between 30 Hz and 50 Hz (preferably 40 Hz) can induce gamma oscillations in the brain which can lead to a reduction of the effects of neurodegenerative disorders. System 1800 may be configured to assign a passive treatment to provide a stimulus operating at or near the 40 Hz frequency based on the comparison of received gait parameters and the associated neurodegenerative condition, if any. The treatment is considered passive because unlike the primary task (e.g., riding an exercise bike) and associative activity task (e.g., solving a puzzle), which both involve active participation from an individual, the individual can undergo the passive treatment without active participation. For example, passive treatment may comprise activating an transducer (e.g., light source, such as light emitting diode) at a frequency between 30 Hz and 50 Hz. As another example, the transducer may be a speaker which outputs a sound within a given frequency range. As yet another example, passive treatment may be implemented on a display 1805 which utilizes both a light source and speakers to emit both light and sound signals, respectively, simultaneously, or with each stimulus occurring individually. In this way, system 1800 can provide passive treatment separate from, or in conjunction with dual task entrainment therapy.

According to some embodiments, dual task stimulation manager 1801 may further comprise a gait comparator 1809 and a signal generator 1810. Gait comparator 1809 may receive, retrieve, or otherwise obtain gait parameter data related to an individual and compare the gait parameters with historical gait data stored in neurological function database 1802. Gait parameters may calculated based on an individual's interaction with an exercise machine 1803 while wearing a torso tracking and feedback belt as described above (referring to FIG. 4 and FIG. 7). The exercise machine 1803 may be the exercise machine described in FIG. 4 of U.S. patent application Ser. No. 16/951,281 which is included herein by reference, which leverages a plurality of sensors built into, or configured to interact with the exercise machine in order to gather a plurality of data that can be used as an input to determine an individual's gait and/or gait parameters. Additionally, the plurality of sensors built into the torso tracking and feedback belt may be used as another input to calculate an individual's gait and/or gait parameters. Calculation of an individual's gait and/or gait parameters may be conducted by analyzing the sensor data in a manner similar to that described in cross referenced applications (referring to FIG. 6 of U.S. patent application Ser. No. 16/951,281) to determine gait variability.

According to some embodiments, signal generator 1810 may allow for configuration of a passive treatment by generating a signal based on a plurality of treatment parameters. In some embodiments, signal generator 1810 may receive, retrieve, or otherwise obtain information about brainwave entrainment therapies and passive treatments and then configure signal generator 1810 to generate a signal based on the passive treatment information. In some embodiments, signal generator 1810 may be manually configured, such as, for example, by a doctor, trainer, or physical therapist, in real-time in order to adjust the passive treatment to the needs of the individual undergoing the treatment and/or therapy regimen. Signal parameters that may be configured include, but is not limited to, amplitude, frequency, phase, magnitude, duration, shape, polarization, period, modulation, level, and irradiance. Furthermore, signal components related to light signals (e.g., blinking light) may include, but are not limited to, wavelength range, color temperature, color, luminous intensity, and irradiance. For example, producing a light signal with a frequency of 40 Hz and a blue color may be used as passive treatment for dementia or other neurodegenerative conditions. Signal generator 1810 may receive a signal configuration and send the signal to a plurality of emitters such as transducers 1806-1808 and/or display 1805.

The neurological database 1802 is a database containing information that associates neurological conditions with primary tasks and associative activities (i.e., dual tasking tasks and their associated activities). This database may be developed from pre-existing information or may be built up over time from dual task assessments. The brainwave entrainment database 1803 is a database of information about brainwave entrainment therapies and passive treatments (i.e., modalities, immersion, intensity, and stimulation frequencies) tending to be more or less effective under certain conditions and in certain situations, including conditions and situations associated with dual task stimulation. The brainwave entrainment database may likewise be developed from pre-existing information or may be built up over time from dual task assessments. Importantly, both the neurological database 1802 and the brainwave entrainment database 1803 may store neurological assessment data for particular individuals over time, and use the results of the neurological assessments of each such individual to create therapy regimens for that individual. This provides concrete information about the effectiveness of created therapy regimens on a given individual, and allows for future therapy regimens to be adjusted to meet the needs of that individual. For example, an individual's gait parameters may be tracked over time to monitor and assess the efficacy of the therapy regimens and passive treatments.

Once a therapy regimen is created, the dual task stimulation manager assigns dual task stimulation, including passive treatment, to the individual undergoing treatment comprising a primary task and an associative task. In this case the primary task involves exercise on an exercise machine 1804, and the associative task involves solving puzzles on a display 1805. The exercise machine provides feedback to the dual task stimulation manager 1801 as to whether the primary task is being performed, and the display provides feedback as to whether the associative activity is being performed. While the dual task stimulation is being performed, the dual task stimulation manager sends signals to the appropriate transducers 1806-1808 to operate them according to the appropriate stimulation frequency.

Figure 19:
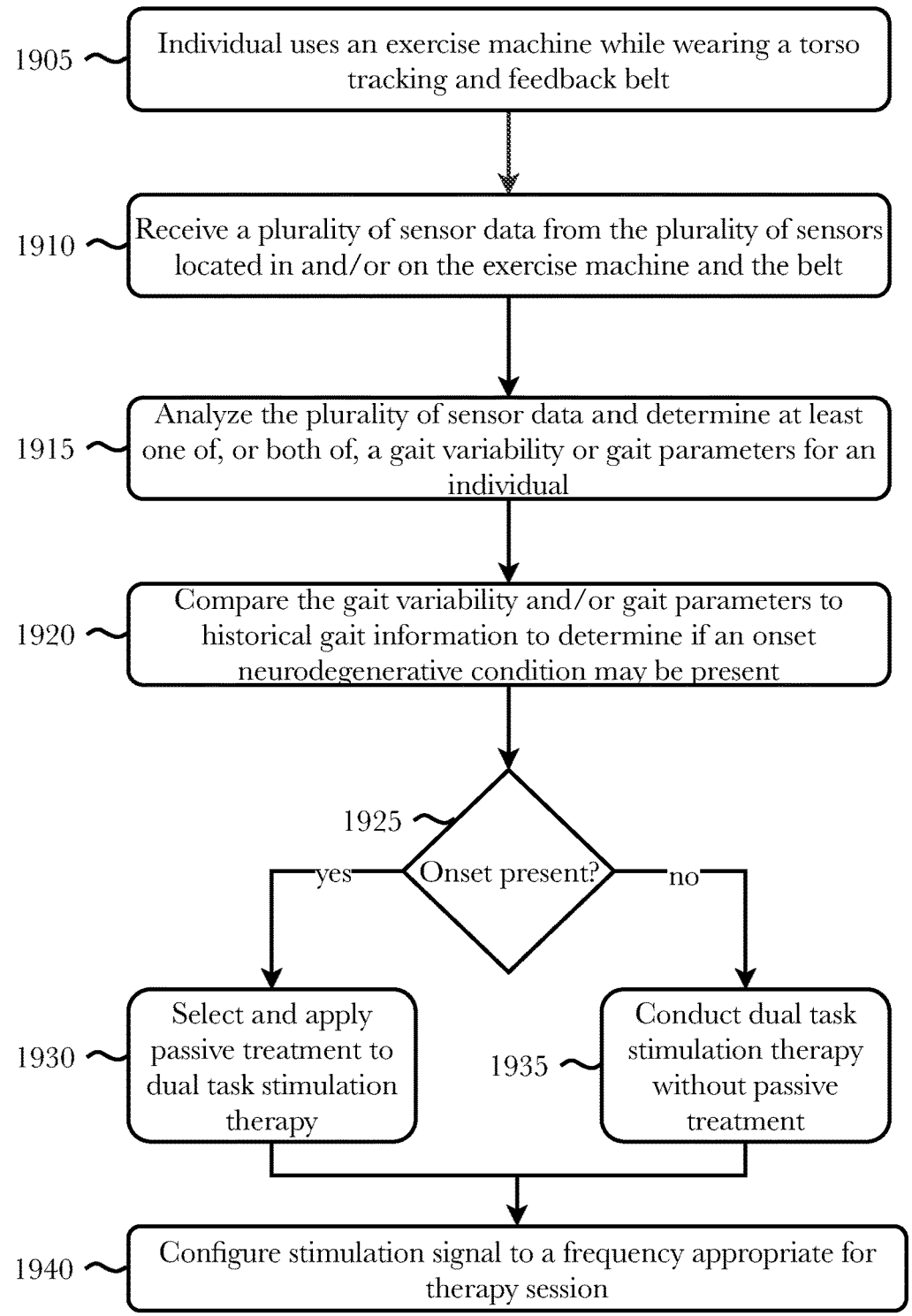
FIG. 19 is a flow diagram illustrating an exemplary method for determining passive treatment based on the analysis of an individual's gait parameters, according to some embodiments.

FIG. 19 is a flow diagram illustrating an exemplary method 1900 for determining passive treatment based on the analysis of an individual's gait parameters, according to some embodiments. According to some embodiments, the process begins 1905 when an individual use an exercise machine while wearing a torso tracking and feedback belt. The exercise machine and the torso tracking and feedback belt may comprise a plurality of sensors that provide multiple data points for the calculation and/or determination of an individual's gait, or the parameters and/or characteristics which describe an individual's gait. The a plurality of sensor data from the plurality of sensors located in and/or on the exercise machine and the torso tracking and feedback belt is then received by a computing device 1910 which is configured 1915 to analyze the plurality of sensor and determine at least one or, or both of, a gait variability or gait parameters for the individual. The determined gait parameters may then be received, retrieved, or otherwise obtained by dual task stimulation manager 1801 or one of its components such as gait comparator 1809, and 1920 compared to historical gait information stored within neurological function database 1802 to determine if an onset neurodegenerative condition may be present in the individual. If the comparison of the individual's gait parameters with the historical gait data indicates that a neurodegenerative condition may be onset 1925, then a passive treatment may be selected from neurological function database 1802 applied to a dual task stimulation therapy session 1930 in order to provide passive treatment in conjunction with the primary task and associate activity. The passive treatment may be linked with known neurodegenerative conditions stored in database 1802. If instead, the comparison of the individual's gait indicates that a neurodegenerative condition may not be onset 1925, then no passive treatment is necessary and the dual task stimulation therapy may be conducted without the inclusion of passive treatment 1935. As a last step, 1940 the stimulation signal characteristics may be configured to be appropriate for the therapy session. For example, passive treatment may require that output signals to certain transducers, or a certain display, are at a certain frequency between 30 Hz and 50 Hz (preferably about 40 Hz) in the case of visual (e.g., blinking light) and/or audible stimulation. Furthermore, visual stimulation signal may be further configured to emit a certain spectral light color or wavelength, according to some embodiments.

Figure 20:
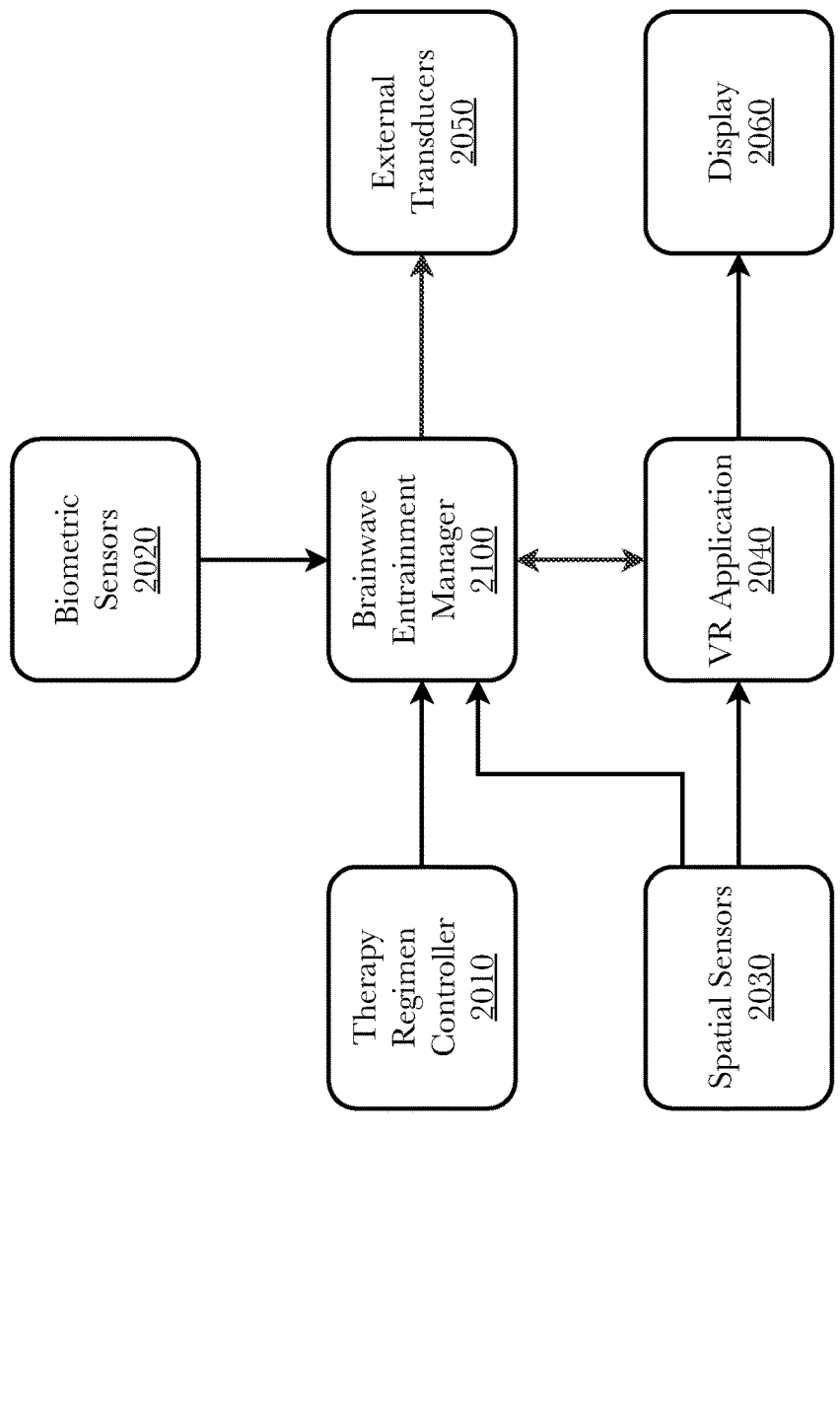
FIG. 20 is a diagram showing an exemplary overall system architecture for a brainwave entrainment system using virtual objects and environments as visual, stimulation transducers.

FIG. 20 is a diagram showing an exemplary overall system architecture 2000 for a brainwave entrainment system using virtual objects and environments as visual stimulation transducers. In this embodiment, the system comprises a brainwave entrainment manager 2100, a virtual reality (VR) application 2040, a therapy regimen controller 2010, one or more spatial sensors 2030, one or more biometric sensors 2020, and one or more external transducers, and a display 2060.

The brainwave entrainment manager 2100 is the core of the system, and manages inputs from, and outputs to, other components of the system. It is responsible for selection of entrainment routines, evaluation of the user's attention, and activation of both virtual and physical stimulation transducers.

The therapy regimen controller 2010 is an administrative interface that allows an administrator (e.g., a physician, therapist, masseuse, or other service provider) to select therapy regimens for application to the user (who may be a patient, client, etc., of the administrator). The therapy regimen controller 2010 may be used, for example, to select a regimen for brainwave entrainment that emphasizes alpha wave stimulation to induce relaxation in an overstimulated user.

The biometric sensors 2020 are sensors that measure a physical or physiological characteristic of the user, such as heart rate, temperature, sweat production, brain activity (using an electroencephalograph, or EEG), etc. Biometric sensors 2020 are used to provide feedback to the brainwave entrainment manager 2100 as to the physical or physiological state of the user, which may be used to infer the user's mental state. For example, a biometric sensor 2020 that measures the user's heart rate may be used to infer the user's level of relaxation (or lack thereof), thus providing feedback as to the effectiveness of alpha brainwave entrainment intended to induce relaxation.

Spatial sensors 2030 are sensors that measure a user's physical location in space or a location at which the user is focusing his or her attention. For two dimensional screens, eye movement may be tracked and the location of the user's gaze may be calculated. In the case of virtual reality (VR), the user's body may be tracked, or if the user is wearing a VR headset, the orientation of the headset can be used to detect the user's head movements. Spatial sensors 130 are used to detect the user's engagement with virtual objects and virtual environments, such that brainwave entrainment using those objects and environments can be adjusted, accordingly.

The VR application 2040 is used for gamification of brainwave entrainment. While a VR application 2040 is shown here, in principle any computer game, puzzle, display, or animation can be used, whether interactive or not, and whether three-dimensional or two-dimensional. The VR application 2040 can be a specially-designed program intended for use with the system, or can be an off-the-shelf game or application adapted for use with the system. In either case, the VR application 2040 will either have an interface with the brainwave entrainment manager 2100, or will have a brainwave entrainment manager 2100 integrated into it, whereby the brainwave entrainment manager 2100 is used to control brainwave entrainment using the virtual objects in the VR application 2040.

The external transducers 2050 are physical stimulation transducers that may be used to complement brainwave entrainment using virtual objects. A non-limiting list of external transducers 150 includes lights or LEDs, speakers or other audio-producing devices, vibratory or other pressure-producing devices, and electrical stimulators. As an example, while brainwave entrainment is being applied visually using virtual objects on a screen, the brainwave entrainment may be supplemented or complemented by audible brainwave entrainment using speakers.

The display 2060 may be any type of display producing an output visible to a user of the system. A non-limiting list of displays 2060 includes computer and tablet screens, VR headsets, and projectors. The display 2060 is the means by which visual brainwave entrainment may be applied using virtual objects.

Figure 21:
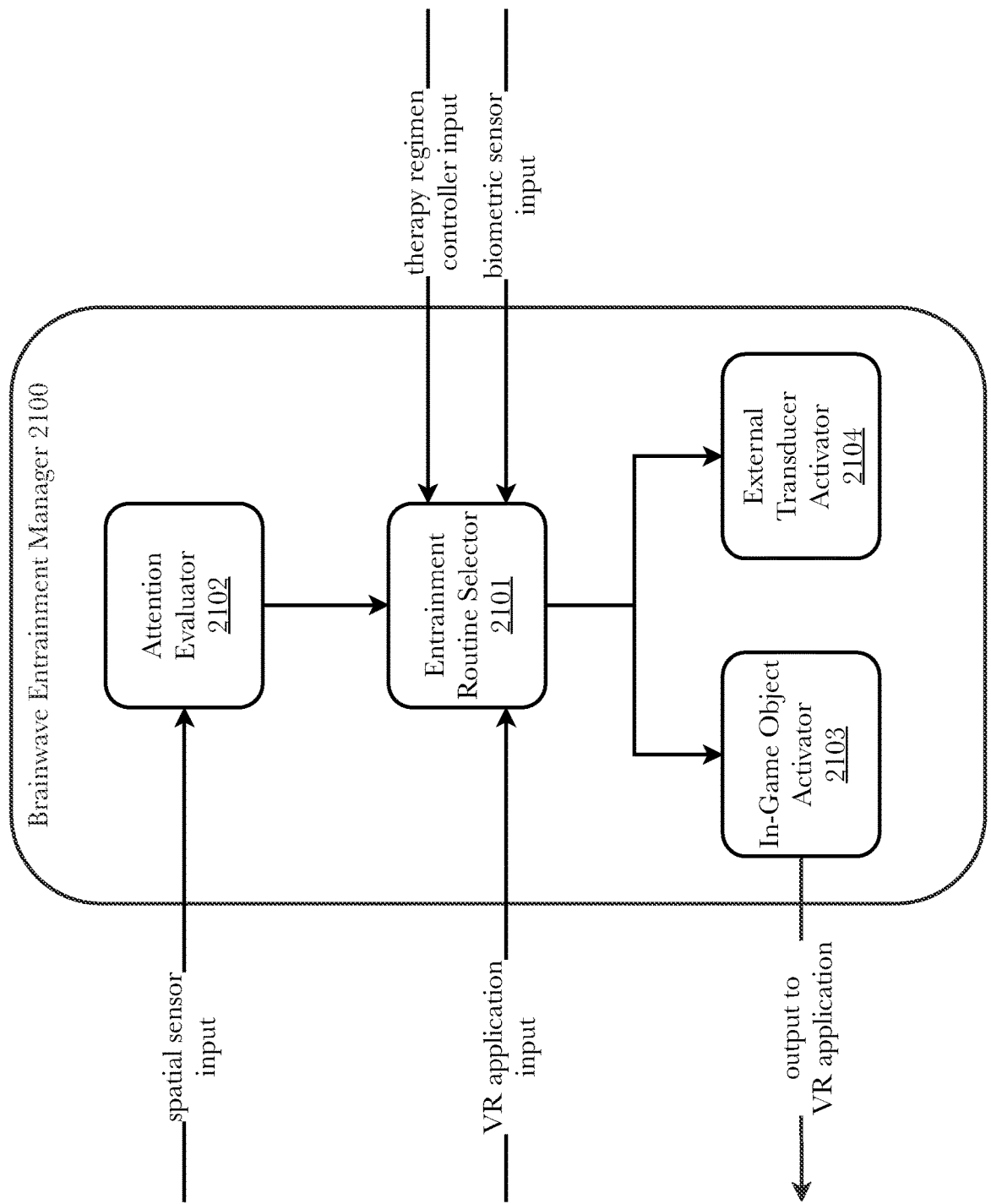
FIG. 21 is a diagram showing an exemplary architecture for the brainwave entrainment manager aspect of the brainwave entrainment using virtual objects and environments as visual, stimulation transducers.

FIG. 21 is a diagram showing an exemplary architecture for the brainwave entrainment manager aspect of the brainwave entrainment using virtual objects and environments as visual stimulation transducers. In this embodiment, the brainwave entrainment manager 2100 comprises an entrainment routine selector 2101, an attention evaluator 2102, an in-game object activator 2103, and an external transducer activator 2104. The entrainment routine selector 2101 receives input VR application input, therapy regimen controller input, and biometric sensor input, and input from the attention evaluator 2102. Based on those inputs, the entrainment routine selector chooses and/or modifies a brainwave routine appropriate for the circumstances. For example, if the therapy regimen controller input specifies that the overall brainwave entrainment goal is relaxation, the entrainment routine selector 2101 may select alpha wave entrainment as the primary entrainment therapy, and may choose to apply alpha wave entrainment to a background virtual object, as flashing of background objects will be less intrusive (and possibly more relaxing) to the user than flashing of objects to which the user's attention is directed. To determine which objects are not the subject of the user's attention, the attention evaluator 2102 receives input from a spatial sensor (e.g., a camera used to track eye movements) to determine where the user is looking on the screen at a given moment. The entrainment routine selector 2101 then modifies the entrainment routine to flash an object or objects at which the user is not looking using an in-game object activator 2103 which interfaces with the VR application to identify which objects should be flashed.

The user's attention need not be tracked via a camera, and may be tracked through other means. For example, the user's attention may be tracked by monitoring the user's interaction with the virtual objects or virtual environment in the form of mouse clicks, keyboard activity, orientation of the user's head or body (e.g., when a virtual reality headset is being used), orientation and/or movement of hand-held trackable devices such as game controllers with integrated accelerometers, gyroscopes, etc. In some embodiments, the user's attention may be tracked not in terms of visual direction or attention, but in the more general sense of focus, consistency, ability to concentrate, level of interest, response times, or other factors not necessarily associated with the direction of the user's vision. All of these things may be incorporated into decisions by the entrainment routine selector 201 as to changes to be made to the entrainment routine.

Simultaneously, the entrainment routine selector 2101 may activate one or more external transducers 2104 using an external transducer activator 2104, where the entrainment routine selector 2101 determines that external transducers may supplement or complement the brainwave entrainment using virtual objects. The entrainment routine selector 2101 may further use feedback to determine whether the selected entrainment routine is having the desired effect. As an example, the entrainment routine selector 2101 may use biometric feedback such as a user's heart rate (e.g., a lowering heart rate may be used to infer relaxation) to change the entrainment routine. For example, a lowering heart rate during alpha wave entrainment would likely indicate relaxation, in which case the entrainment routine would remain unmodified, but a rising heart rate would likely indicate irritation, in which case the entrainment routine might be modified by reducing the entrainment to theta wave entrainment to further induce relaxation.

Many other types and implementations of feedback are possible including, but not limited to, changing of entrainment routines based on user reactions to, or interactions with, virtual objects and virtual environments; user attention attributes such as the location, intensity, focus, and consistency of user attention to virtual objects and virtual environments; game scores and other gaming metrics; physical biofeedback such as monitoring heart rate, perspiration, respiration; cognitive biofeedback such as monitoring changes in an EEG; exercise equipment feedback such as treadmill speed, cycling cadence and/or power, rowing strokes per minute and/or power. Further, entrainment routines can be changed to use different types of stimulation (e.g., if the feedback indicates that visual stimulation is less effective at certain points in a game, it can be supplemented with auditory or haptic feedback). Multiple stimulation devices can be used to augment or supplement the visual stimulation including, but not limited to, haptic headbands or vest, speakers or headphones, and other stimulation devices. In this way, the system can be programmed to automatically adapt to users based on a variety of feedback sources.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
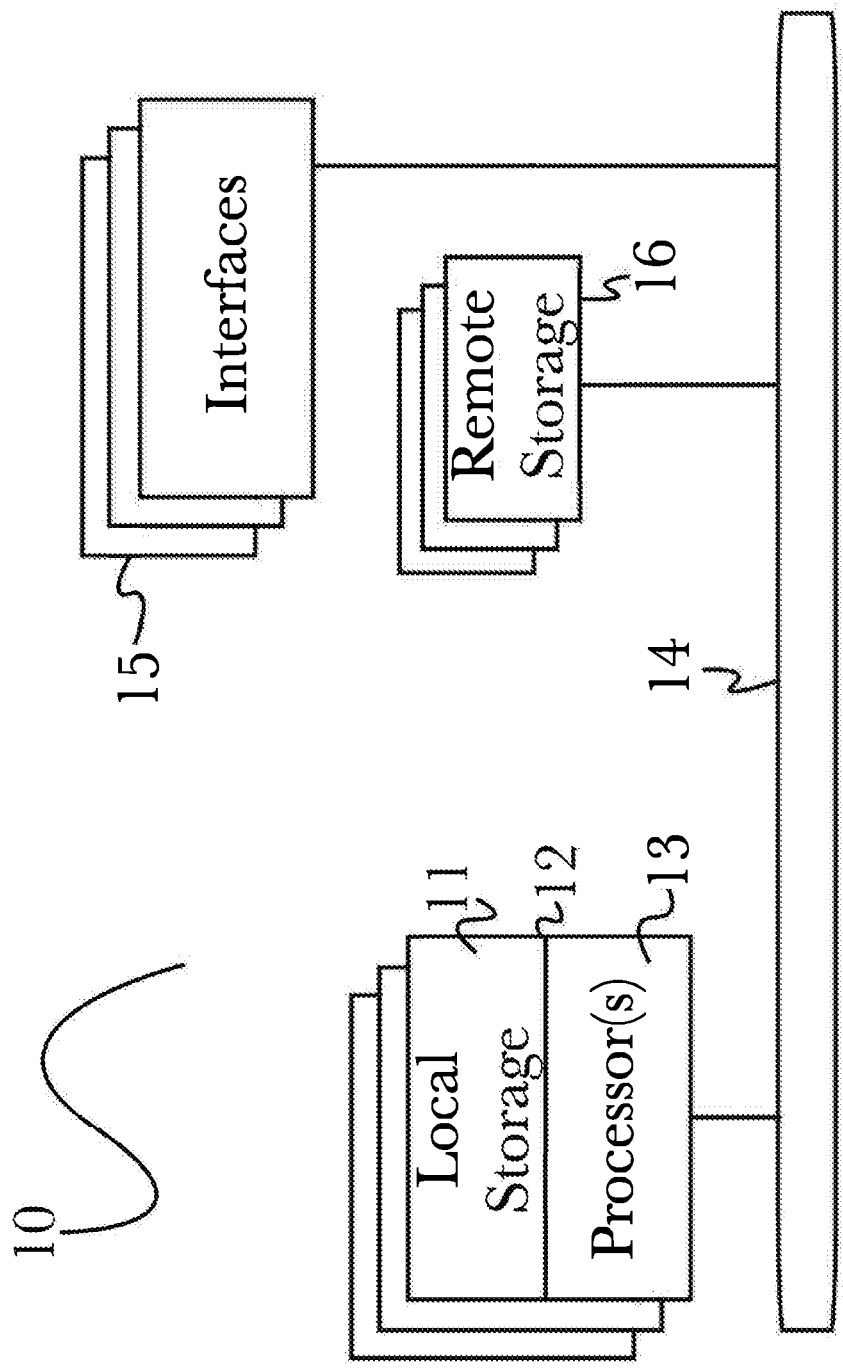
FIG. 4 is a block diagram illustrating an exemplary hardware architecture of a computing device used in an embodiment of the invention.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
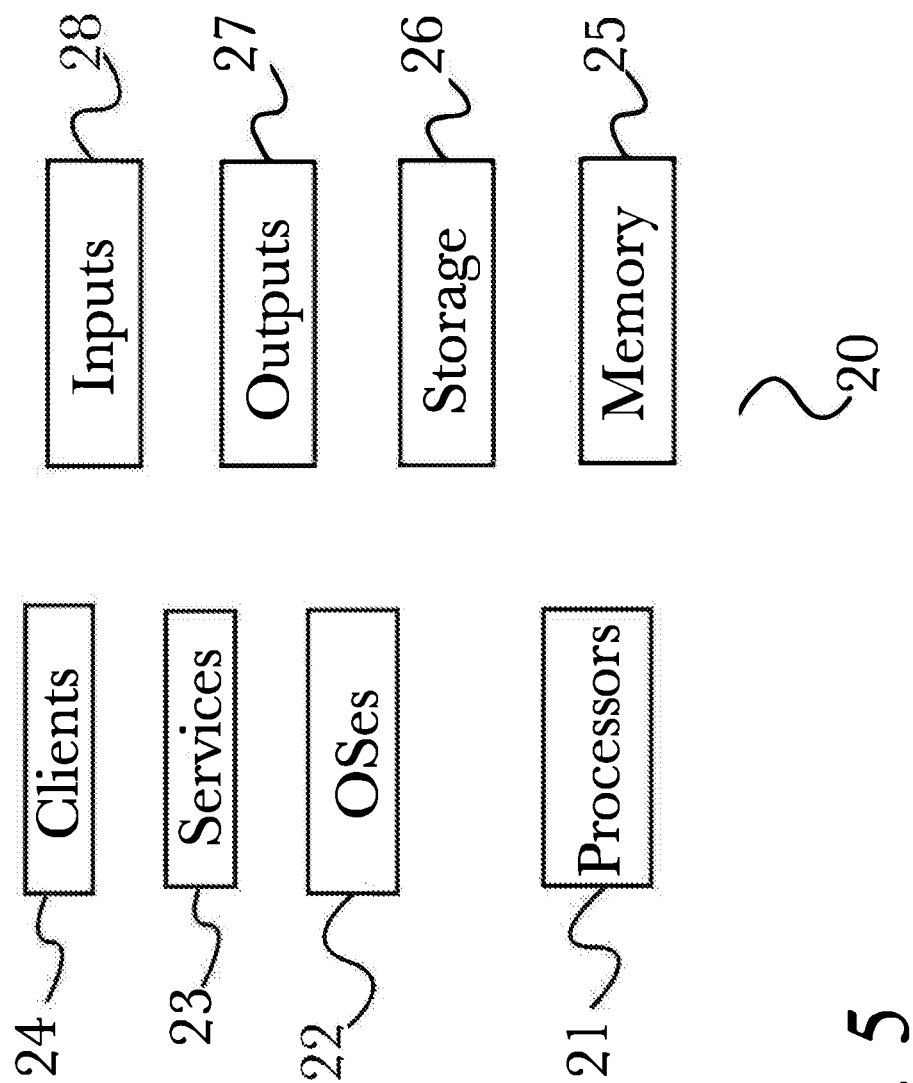
FIG. 5 is a block diagram illustrating an exemplary logical architecture for a client device, according to an embodiment of the invention.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE MACOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
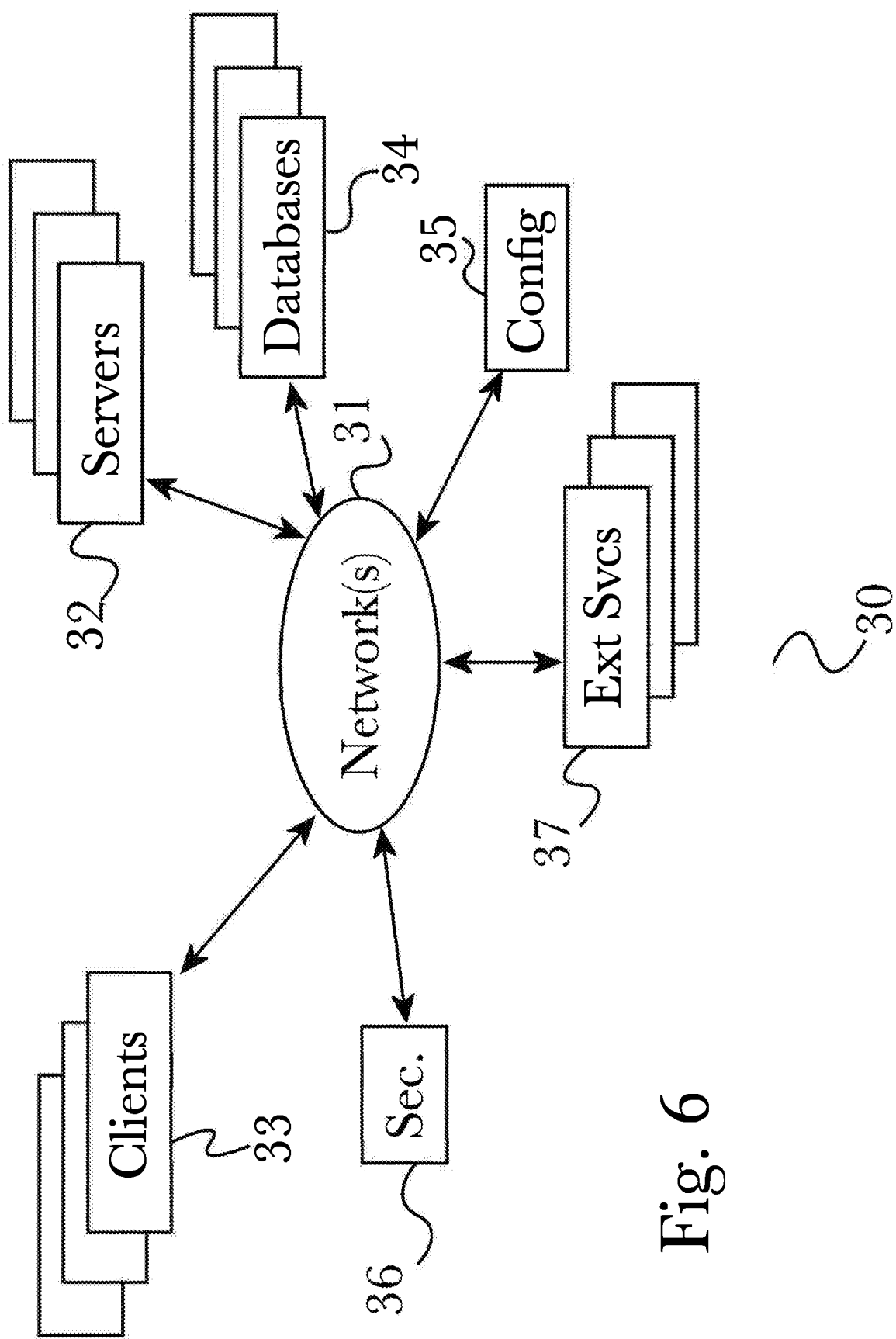
FIG. 6 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
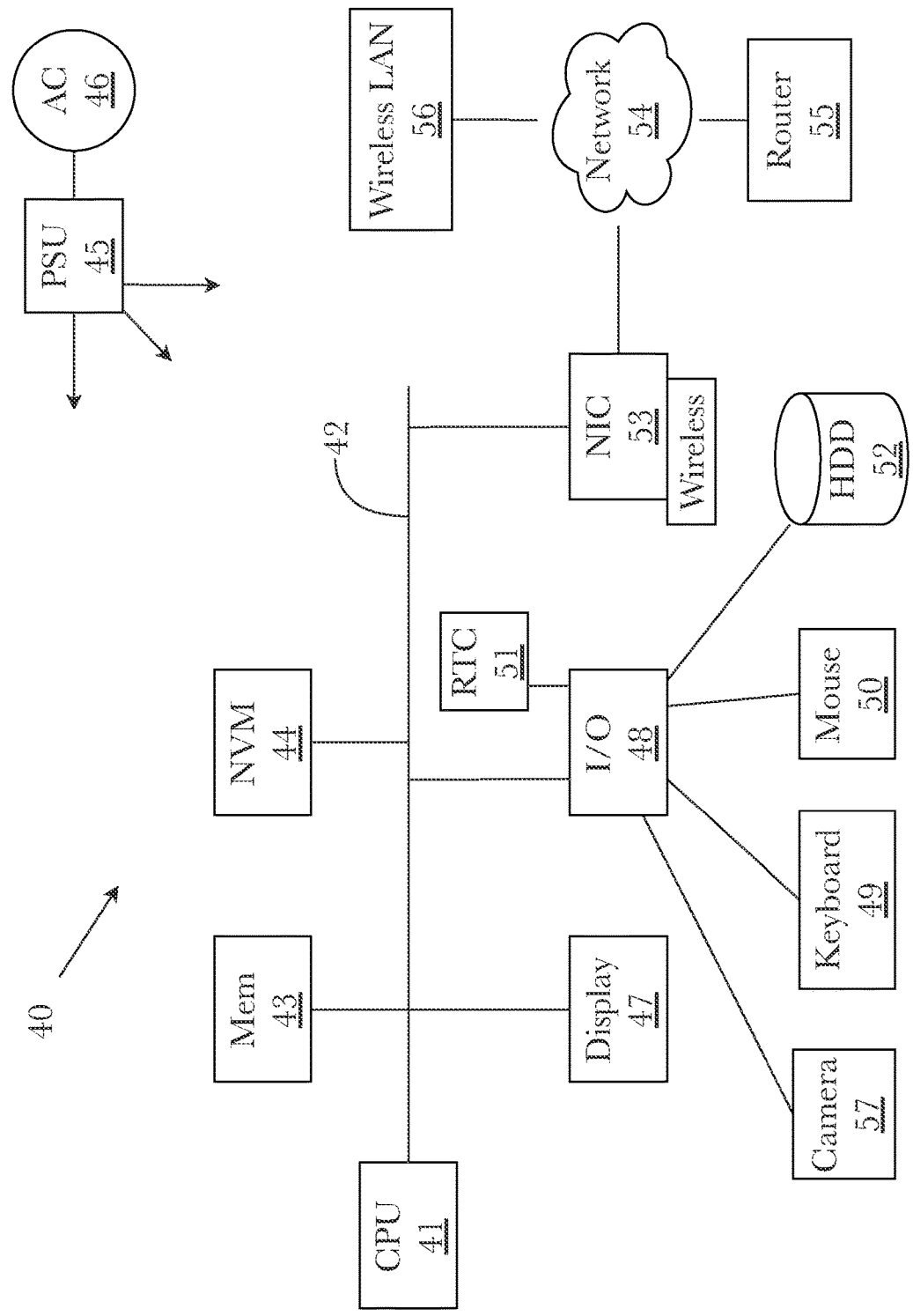
FIG. 7 is another block diagram illustrating an exemplary hardware architecture of a computing device used in various embodiments of the invention.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC)

devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A variable-resistance exercise machine with communication for smart device control and brainwave entrainment, comprising:
    a computing device comprising a memory, a processor, and a network interface device;
    a sensor configured to detect movement of a user of the exercise machine;
    a plurality of moving surfaces each configured to provide an independent degree of resistance to movement in response to the changes from a controller;
    the controller comprising a first plurality of programming instructions stored in the memory which, when operating on the processor, causes the computing device to:
        receive input from a user device via the network interface device, the input comprising a user interaction received via an interactive software application operating on the user device;
        receive output from the sensor, the sensor output comprising a detected movement of the user of the exercise machine;
        change a degree of resistance of each of a plurality of moving surfaces based on the input;
        send the sensor output to a brainwave entrainment manager;
        receive a brainwave entrainment frequency from the brainwave entrainment manager;
        send the brainwave entrainment frequency to the user device; and
    a brainwave entrainment manager comprising a second plurality of programming instructions stored in the memory which, when operating on the processor, cause the computing device to:
        receive the sensor output from the controller;
        select a brainwave entrainment frequency based on the sensor output; and
        send the brainwave entrainment frequency to the controller.

2. The exercise machine of claim 1, further wherein the user device:
    receives the sensor output from the network interface device;
    changes a display of a virtual object within the interactive software application at the brainwave entrainment frequency; and
    changes operation of the interactive software application in response to the sensor output.

3. The exercise machine of claim 2, wherein the interactive software application is a virtual reality application.

4. The exercise machine of claim 2, wherein the interactive software application is software configured to enable use of the user device for physical therapy.

5. The exercise machine of claim 2, wherein the user device is a wearable computing device.

6. The exercise machine of claim 1, further comprising a plurality of steps configured to assist a human user in mounting and dismounting the exercise machine safely.

7. The exercise machine of claim 1, wherein at least a portion of the plurality of moving surfaces comprises an integrally-formed textured surface configured to provide adequate purchase when pressure is applied by a portion of the user's body.

8. The exercise machine of claim 2, wherein the user device comprises one or more lights and one or more speakers, wherein the one or more lights and the one or more speakers are configured to output stimulation.

9. The exercise machine of claim 1, wherein stimulation is either visual, auditory, vibratory, or electrical stimulation at a stimulation frequency between 0.5 Hz and 100 Hz.

10. A method for controlling a variable-resistance exercise machine with communication for smart device control and brainwave entrainment, comprising:
    receiving output from a sensor on an exercise machine, the exercise machine comprising a plurality of moving surfaces each configured to provide an independent degree of resistance to movement, and the sensor output comprising a detected movement of a user of the exercise machine; and
    receiving, at a computing device comprising a memory, a processor, and a network interface device, input from a user device via the network interface device, the input comprising a user interaction received via an interactive software application operating on the user device;
    selecting a brainwave entrainment frequency using a brainwave entrainment manager operating on the computing device, the brainwave entrainment frequency being selected based on the sensor output;
    changing a degree of resistance of each of the plurality of moving surfaces based on the input; and
    sending the brainwave entrainment frequency to the user device.

11. The method of claim 10, further wherein the user device:
    receives the sensor output from the network interface device;
    changes a display of a virtual object within the interactive software application at the brainwave entrainment frequency; and
    changes the operation of the interactive software application in response to the sensor output.

12. The method of claim 11, wherein the interactive software application is a virtual reality application.

13. The method of claim 10, wherein the interactive software application is software configured to enable use of the user device for physical therapy.

14. The method of claim 10, wherein the user device is a wearable computing device.

15. The method of claim 10, further comprising a plurality of steps configured to assist a human user in mounting and dismounting the exercise machine safely.

16. The method of claim 10, wherein at least a portion of the plurality of moving surfaces comprises an integrally-formed textured surface configured to provide adequate purchase when pressure is applied by a portion of the user's body.

17. The method of claim 10, wherein the user device comprises one or more lights and one or more speakers, wherein the one or more lights and the one or more speakers are configured to output the stimulation.

18. The method of claim 10, wherein the stimulation is either visual, auditory, vibratory, or electrical stimulation at a stimulation frequency between 0.5 Hz and 100 Hz.

\* \* \* \* \*